(12) United States Patent
Iwaki et al.

(10) Patent No.: US 12,512,240 B2
(45) Date of Patent: Dec. 30, 2025

(54) GRAIN-ORIENTED ELECTRICAL STEEL SHEET AND METHOD FOR MANUFACTURING SAME

(71) Applicant: NIPPON STEEL CORPORATION, Tokyo (JP)

(72) Inventors: Masataka Iwaki, Tokyo (JP); Takashi Kataoka, Tokyo (JP); Tomohito Tanaka, Tokyo (JP); Hideyuki Hamamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 309 days.

(21) Appl. No.: 18/283,162

(22) PCT Filed: Mar. 28, 2022

(86) PCT No.: PCT/JP2022/015221
§ 371 (c)(1),
(2) Date: Sep. 20, 2023

(87) PCT Pub. No.: WO2022/203088
PCT Pub. Date: Sep. 29, 2022

(65) Prior Publication Data
US 2024/0177901 A1    May 30, 2024

(30) Foreign Application Priority Data
Mar. 26, 2021 (JP) .................. 2021-053619

(51) Int. Cl.
| | |
|---|---|
| *H01F 1/18* | (2006.01) |
| *C03C 8/02* | (2006.01) |
| *C03C 10/00* | (2006.01) |
| *C21D 6/00* | (2006.01) |
| *C21D 8/12* | (2006.01) |
| *C21D 9/46* | (2006.01) |
| *C21D 10/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/16* | (2006.01) |
| *C22C 38/34* | (2006.01) |
| *C22C 38/60* | (2006.01) |
| *C23D 3/00* | (2006.01) |
| *C23D 5/04* | (2006.01) |
| *C23D 13/00* | (2006.01) |

(52) U.S. Cl.
CPC .............. *H01F 1/18* (2013.01); *C03C 8/02* (2013.01); *C03C 10/00* (2013.01); *C21D 6/002* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 8/1283* (2013.01); *C21D 8/1288* (2013.01); *C21D 9/46* (2013.01); *C21D 10/005* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/16* (2013.01); *C22C 38/34* (2013.01); *C22C 38/60* (2013.01); *C23D 3/00* (2013.01); *C23D 5/04* (2013.01); *C23D 13/00* (2013.01); *C03C 2204/00* (2013.01); *C03C 2207/04* (2013.01); *C21D 2201/05* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 6,368,424 B1 | 4/2002 | Sakai et al. | |
| 2006/0169362 A1 | 8/2006 | Sakai et al. | |
| 2009/0145526 A1* | 6/2009 | Arai ................ | H01F 1/16 |
| | | | 148/306 |
| 2010/0243629 A1 | 9/2010 | Sakai et al. | |
| 2018/0037965 A1 | 2/2018 | Takajo et al. | |
| 2021/0043345 A1 | 2/2021 | Kataoka et al. | |
| 2022/0127692 A1 | 4/2022 | Arai et al. | |

FOREIGN PATENT DOCUMENTS

| | | |
|---|---|---|
| JP | 3361709 B2 | 1/2003 |
| JP | 4510757 B2 | 7/2010 |

(Continued)

*Primary Examiner* — Kim S. Horger
(74) *Attorney, Agent, or Firm* — Birch, Stewart, Kolasch & Birch, LLP

(57) ABSTRACT

This grain-oriented electrical steel sheet includes a base steel sheet, a glass coating formed on the base steel sheet, and a tension-applied insulation coating formed on the glass coating, in which, in the base steel sheet, a plurality of linear strain regions that extend continuously or intermittently in a direction intersecting with a rolling direction are present, the plurality of linear strain regions are each 210 μm or less in width in the rolling direction, the plurality of linear strain regions are parallel to each other, intervals of linear strain regions adjacent to each other in the rolling direction are 10 mm or less, and magnetostriction $\lambda_{0\text{-}pb}$ in a unit of μm/m when the grain-oriented electrical steel sheet is excited up to 1.7 T and magnetostriction $\lambda_{0\text{-}pa}$ in a unit of μm/m when the grain-oriented electrical steel sheet is heat-treated at 800° C. for 4 hours and then excited up to 1.7 T satisfy $0.02 \leq \lambda_{0\text{-}pb} - \lambda_{0\text{-}pa} \leq 0.20$.

18 Claims, No Drawings

(56) References Cited

FOREIGN PATENT DOCUMENTS

| JP | 4669565 B2 | 4/2011 |
| JP | 6060988 B2 | 1/2017 |
| JP | 6176282 B2 | 8/2017 |
| WO | WO 2012/172624 A1 | 12/2012 |
| WO | WO 2019/182154 A1 | 9/2019 |
| WO | WO 2020/158732 A1 | 8/2020 |

* cited by examiner

GRAIN-ORIENTED ELECTRICAL STEEL SHEET AND METHOD FOR MANUFACTURING SAME

TECHNICAL FIELD OF THE INVENTION

The present invention relates to a grain-oriented electrical steel sheet and a method for manufacturing the same.

Priority is claimed on Japanese Patent Application No. 2021-053619, filed Mar. 26, 2021, the content of which is incorporated herein by reference.

RELATED ART

Grain-oriented electrical steel sheets are soft magnetic materials and are mainly used as core materials of transformers. Therefore, grain-oriented electrical steel sheets are required to have magnetic characteristics such as high magnetization characteristics and a low iron loss.

The iron loss is a power loss that is consumed as heat energy in the case of exciting a core with an AC magnetic field, and the iron loss is required to be as low as possible from the viewpoint of energy saving. The degree of iron loss is affected by magnetization rate, sheet thickness, coating tension, the amount of impurities, electric resistivity, grain sizes, magnetic domain sizes, and the like. Although a variety of techniques have been thus far developed regarding grain-oriented electrical steel sheets, research and development for reducing iron loss is still underway in order to increase energy efficiency.

For example. Patent Document 1 discloses a method for manufacturing a grain-oriented electrical steel sheet having a step of irradiating a surface of a grain-oriented electrical steel sheet with a focused continuous-wave laser beam while scanning the grain-oriented electrical steel sheet in a direction inclined with respect to a rolling direction and a step of repeating irradiation while shifting portions to be scanned with the continuous-wave laser beams at predetermined intervals, in which, when an average power of the continuous-wave laser beams is represented by P(W), a velocity of the scanning is represented by Vc (mm/s), the predetermined intervals are represented by PL (mm), and an average irradiation energy density Ua is defined as Ua=P/(Vc×PL) (mJ/mm$^2$), magnetic domains are controlled by irradiation with the laser beams in a manner that 1.0 mm≤PL≤3.0 mm and 0.8 mJ/mm$^2$≤Ua≤2.0 mJ/mm$^2$ are satisfied.

Patent Document 1 shows that iron losses can be reduced in both directions of an L direction and a C direction of the grain-oriented electrical steel sheet while easily ensuring high productivity.

In addition, Patent Document 2 discloses a method for manufacturing a grain-oriented electrical steel sheet in which linear closure domains are formed approximately perpendicular to a rolling direction of the steel sheet at approximately constant intervals by scanning and irradiation with continuously oscillating laser beams to improve iron loss characteristics.

Patent Document 2 shows that, when a laser is in a TEM$_{00}$ mode in which the laser beam intensity profile in a cross section perpendicular to a beam propagation direction has the maximum intensity near the center of the optical axis, and the focused diameter d [mm] in the rolling direction of the irradiation beam, the scanning linear velocity V [mm/s] of the laser beam, and the average output P [W] of the laser are in ranges of 0<d≤0.2 and 0.001≤P/V≤0.012, a grain-oriented electrical steel sheet having a reduced iron loss can be obtained.

In addition, Patent Document 3 discloses a method for manufacturing a grain-oriented electrical steel sheet, in which a surface of a grain-oriented electrical steel sheet is irradiated with a laser beam at equal intervals to improve magnetic characteristics.

In Patent Document 3, it is shown that the laser is a pulse-oscillating Q-switch $CO_2$ laser, the irradiation beam shape is an ellipse having a major axis in the sheet width direction, the irradiation power density of the laser pulse is set to be equal to or less than the membrane damage threshold on the surface of the steel sheet, thereby suppressing the generation of a laser irradiation mark, and the long axis length of the elliptical beam is set to be equal to or more than the pulse beam irradiation interval in the sheet width direction, whereby continuous pulse beams are superimposed on the surface of the steel sheet, a cumulative irradiation energy large enough for magnetic characteristics improvement is imparted, and an efficient magnetic domain control effect can be obtained by suppressing laser irradiation marks.

Incidentally, in recent years, there has been an increasing demand for reduction of noise and vibration in electromagnetic application equipment such as transformers, and grain-oriented electrical steel sheets that are used for cores of transformers are required to be a material suitable for not only a low iron loss but also low noise or low vibration. It is said that one of the causes in materials for the noise or vibration of transformers is the magnetostriction of grain-oriented electrical steel sheets. The magnetostriction mentioned herein refers to vibration that is shown in the rolling direction of a grain-oriented electrical steel sheet caused by a slight change in the outer shape of the grain-oriented electrical steel sheet in association with a change in the intensity of magnetization when the grain-oriented electrical steel sheet has been excited by alternating currents. The magnitude of this magnetostriction is an order of $10^{-6}$ and extremely small, but this magnetostriction generates vibration in cores, the vibration propagates into an external structure such as a tank of a transformer and turns into noise.

Laser irradiation to a grain-oriented electrical steel sheet as proposed in Patent Documents 1 to 3 described above is effective for reducing iron losses, but there is a problem in that a closure domain that is formed by laser irradiation increases magnetostriction, whereby noise characteristics deteriorate.

With respect to such a problem, for example. Patent Document 4 discloses a grain-oriented electrical steel sheet having a low iron loss and in which a noise is small when incorporated into a transformer.

Patent Document 4 shows that, when closure domain regions having a width in the rolling direction on the surface of the steel sheet changing periodically are formed, each of the closure domain regions satisfies conditions that the ratio (Wmax/Wmin) of the maximum width Wmax to the minimum width Wmin in the rolling direction on the surface of the steel sheet is 1.2 or more and 2.2 or less, the average width Wave in the rolling direction on the surface of the steel sheet is 80 μm or more and 200 μm or less, the maximum depth D in the sheet thickness direction is 32 μm or more, and (Wave×D)/s is 0.0007 mm or more and 0.0016 mm or less, it is possible to realize a more favorable iron loss/noise balance than in the related art.

In addition, Patent Document 5 describes a grain-oriented electrical steel sheet in which local strains are introduced in a direction crossing a rolling direction at periodic intervals in the rolling direction, in which linear closure domain portions are formed near the strains, in a demagnetization state, magnetic domains having a rolling-direction length of 1.2 mm or more elongated in the rolling direction from the closure domain portion are present, and, furthermore, in regions along the closure domain portions, in a case where 1.8 or more magnetic domains per millimeter are formed on average, and linear intervals of the closure domain portions are represented by s (mm), a width of the closure domain portion: w (mm) and a depth of the closure domain portion in a sheet thickness direction: h (μm) satisfy a relationships of 4 mm≤s≤1.5 mm and hw/s≤0.9 μm.

Patent Document 5 suggests that the strain introduction amount index represented by hw/s affects iron losses and noise.

However, as a result of the present inventors' studies, it was found that, in the techniques of Patent Documents 4 and 5, improvement in noise characteristics is not sufficient with respect to a superior iron loss/noise balance that has been required in recent years. Furthermore, it was found that magnetic domain control also damages a coating that is formed on the surface of a steel sheet to impart insulation properties and tension to grain-oriented electrical steel sheets and thus degrades coating adhesion.

PRIOR ART DOCUMENT

Patent Document

[Patent Document 1] Japanese Patent No. 4669565
[Patent Document 2] Japanese Patent No. 4510757
[Patent Document 3] Japanese Patent No. 3361709
[Patent Document 4] Japanese Patent No. 6060988
[Patent Document 5] Japanese Patent No. 6176282

DISCLOSURE OF THE INVENTION

Problems to be Solved by the Invention

As described above, conventionally, grain-oriented electrical steel sheets in which the iron loss characteristics and the noise characteristics have been improved sufficiently at the same time and the ensuring of the coating adhesion is also taken into account and methods for manufacturing the same have not been disclosed.

An object of the present invention is to provide a grain-oriented electrical steel sheet having excellent iron loss characteristics and noise characteristics (the iron loss improvement ratio by magnetic domain segmentation is large and noise is small when the grain-oriented electrical steel sheet is incorporated into a transformer: the iron loss/noise balance is excellent) and a method for manufacturing the same. Preferably, the object is to provide a grain-oriented electrical steel sheet having excellent iron loss characteristics and noise characteristics and further having excellent coating adhesion.

Means for Solving the Problem

The present inventors studied magnetic domain control conditions for obtaining a grain-oriented electrical steel sheet having an excellent balance between iron loss characteristics and noise characteristics (iron loss/noise balance). As a result, regarding the conditions for energy ray irradiation for magnetic domain control, it was found that, in a case where the shape of the energy ray on the irradiated surface is controlled, and the input energy is set to relatively large and the power density is set to relatively low, the iron loss/noise balance becomes favorable. However, it was found that, in these steel sheets, coating exfoliation is likely to occur from an energy ray-irradiated portion as a starting point.

In a grain-oriented electrical steel sheet, an irradiated portion is rapidly heated and rapidly cooled by irradiation with an energy ray (a laser beam, an electron beam, or the like). As a result, a residual strain is generated from the surface in the vicinity of the irradiated portion to the inside of the steel sheet, and a strain region (residual strain region) is formed. Coating exfoliation is likely to occur from an energy ray-irradiated portion as a starting point. As the reason of this, it is considers that not only a coating on the irradiated portion is damaged but also a residual strain in the vicinity of the irradiated portion causes the coating exfoliation. In consideration of this, the present inventors attempted to adjust the energy ray irradiation conditions to an amount of strain at which a favorable iron loss/noise balance can be maintained. As a result, it was found that, when the widths or formation intervals of strain regions are made to be in appropriate ranges by adjusting the energy ray irradiation condition, a favorable iron loss/noise balance can be obtained.

In addition, the present inventors attempted to quantify the amount of strain in relation to the magnitude of magnetostriction in a grain-oriented electrical steel sheet on which energy ray irradiation has been performed with a high input energy at a low power density. As a result, it was found that favorable coating adhesion can be ensured by controlling the amount of a change in magnetostriction before and after a specific heat treatment to be within a certain range.

In addition, the present inventors conducted an intensive investigation regarding the modification of a coating with attention also paid to the relationship between the structure of a compound phase configuring the coating and the coating adhesion. As a result of the studies, it was found that a more favorable coating adhesion can be ensured by retaining a $MgAl_2O_4$ phase, which is formed in the coating, in the lower portion of a glass coating.

The present invention has been made in view of the above-described findings. The gist of the present invention is as described below.

[1] A grain-oriented electrical steel sheet according to one aspect of the present invention includes a base steel sheet, a glass coating formed on the base steel sheet, and a tension-applied insulation coating formed on the glass coating, in the base steel sheet, a plurality of linear strain regions that extend continuously or intermittently in a direction intersecting with a rolling direction are present, the plurality of linear strain regions are each 210 μm or less in width in the rolling direction, the plurality of linear strain regions are parallel to each other, intervals of linear strain regions adjacent to each other in the rolling direction are 10 mm or less, and magnetostriction $\lambda_{0\text{-}pb}$ in a unit of μm/m when the grain-oriented electrical steel sheet is excited up to 1.7 T and magnetostriction $\lambda_{0\text{-}pa}$ in a unit of μm/m when the grain-oriented electrical steel sheet is heat-treated at 800° C. for 4 hours and then excited up to 1.7 T satisfy the following expression (1).

$$0.02 \leq \lambda_{0\text{-}pb} - \lambda_{0\text{-}pa} \leq 0.20 \tag{1}$$

[2] In the grain-oriented electrical steel sheet according to [1], the glass coating is formed of a structure including a $Mg_2SiO_4$ phase that is a primary phase and a $MgAl_2O_4$ phase, and, in a cross section in a sheet thickness direction, when the glass coating is divided into three regions having an equal thickness in the sheet thickness direction, each region is designated as a 1/3 region, a 2/3 region, and a 3/3 region from a base steel sheet side toward a tension-applied insulation coating side, an area ratio of the MgAl$_2$O$_4$ phase in the 1/3 region is denoted by S1, an area ratio of the MgAl$_2$O$_4$ phase in the 2/3 region is denoted by S2, and an area ratio of the MgAl$_2$O$_4$ phase in the 3/3 region is denoted by S3, the S1, the S2, and the S3 may satisfy the following expressions (2) to (4).

$$S1 > S2 > S3 \quad (2)$$

$$(S1+S2+S3)/3 < 0.50 \quad (3)$$

$$S3 < 0.10 \quad (4)$$

[3] A method for manufacturing a grain-oriented electrical steel sheet according to another aspect of the present invention is a method for manufacturing the grain-oriented electrical steel sheet according to [1] or [2], the method having a hot rolling step of heating a steel piece to obtain a hot-rolled steel sheet by hot rolling, a hot-rolled sheet annealing step of performing hot-rolled sheet annealing on the hot-rolled steel sheet, a pickling step of pickling the hot-rolled steel sheet after the hot-rolled sheet annealing step, a cold rolling step of performing cold rolling once or a plurality of times with annealing therebetween on the hot-rolled steel sheet after the pickling step to obtain a cold-rolled steel sheet, a decarburization annealing step of performing decarburization annealing on the cold-rolled steel sheet, a final annealing step of applying and drying an annealing separating agent containing a MgO powder as a main component onto front and rear surfaces of the cold-rolled steel sheet after the decarburization annealing step, which is the base steel sheet, and performing final annealing to form glass coatings, a coating-forming step of forming tension-applied insulation coatings on the glass coatings to obtain a grain-oriented electrical steel sheet including the base steel sheet, the glass coatings formed on the base steel sheet, and the tension-applied insulation coatings formed on the glass coatings, and a magnetic domain segmentation step of irradiating surfaces of the tension-applied insulation coatings of the grain-oriented electrical steel sheet with an energy ray to form a plurality of linear strain regions on the base steel sheet, in which, in the magnetic domain segmentation step, among the plurality of linear strain regions, intervals of linear strain regions adjacent to each other in a rolling direction are 10 mm or less, an energy ray power density Ip in a unit of W/mm$^2$ that is defined by (P/S) using an energy ray output P in a unit of W and an energy ray irradiation cross-sectional area S in a unit of mm$^2$ satisfies the following expression (5), an energy ray input energy Up in a unit of J/mm that is defined by P/Vs using the energy ray output P and an energy ray scanning velocity Vs in a unit of mm/sec satisfies the following expression (6), and
a beam aspect ratio of the energy ray, which is defined by (dl/dc) using a diameter dl in a direction perpendicular to a beam scanning direction and a diameter dc in the beam scanning direction, in a unit of μm, and the dl each satisfy the following expression (7) and the following expression (8).

$$250 \leq Ip \leq 2.000 \quad (5)$$

$$0.010 < Up \leq 0.050 \quad (6)$$

$$0.0010 < dl/dc < 1.0000 \quad (7)$$

$$10 < dl < 200 \quad (8)$$

[4] In the method for manufacturing the grain-oriented electrical steel sheet according to [3], the energy ray may be a laser beam.

[5] In the method for manufacturing the grain-oriented electrical steel sheet according to [4], the laser beam may be a fiber laser beam.

[6] In the method for manufacturing the grain-oriented electrical steel sheet according to any one of [3] to [5], the steel piece may contain, by mass %, C: 0.010% to 0.200%, Si: 3.00% to 4.00%, sol. Al: 0.010% to 0.040%, Mn: 0.01% to 0.50%, N: 0.020% or less, S: 0.005% to 0.040%, P: 0.030% or less, Cu: 0% to 0.50%, Cr: 0% to 0.50%, Sn: 0% to 0.50%, Se: 0% to 0.020%, Sb: 0% to 0.500%, and Mo: 0% to 0.10%, and a remainder may be Fe and impurities.

[7] In the method for manufacturing the grain-oriented electrical steel sheet according to any one of [3] to [6], the decarburization annealing step may have a temperature raising process and a soaking process, in the temperature raising process, a temperature rising rate from 550° C. to 750° C. may be set to 700 to 2,000° C./sec, an oxygen potential may be set to 0.0001 to 0.0100, and the soaking process may include a first soaking process where an annealing temperature is set to 800° C. to 900° C. and an annealing time is set to 100 to 500 seconds in an atmosphere having an oxygen potential of 0.4 or more and 0.8 or less and a second soaking process where an annealing temperature is set to 850° C. or higher and 1,000° C. or lower and an annealing time is set to 5 seconds or longer and 100 seconds or shorter in an atmosphere having an oxygen potential of 0.1 or less.

[8] In the method for manufacturing the grain-oriented electrical steel sheet according to any one of [3] to [7], the method may further include, during the decarburization annealing step or after the decarburization annealing step, a nitriding treatment step of performing a nitriding treatment on the cold-rolled steel sheet.

Effects of the Invention

According to the above-described aspects of the present invention, it is possible to provide a grain-oriented electrical steel sheet having a favorable iron loss/noise balance and a method for manufacturing the same. In addition, according to a preferable aspect of the present invention, it is possible to provide a grain-oriented electrical steel sheet having a favorable iron loss/noise balance and also being excellent in terms of coating adhesion.

EMBODIMENTS OF THE INVENTION

A grain-oriented electrical steel sheet according to one embodiment of the present invention (the grain-oriented electrical steel sheet according to the present embodiment) includes a base steel sheet having a predetermined chemical composition, a glass coating formed on the base steel sheet, and a tension-applied insulation coating formed on the glass coating.

In addition, in the base steel sheet, a plurality of linear strain (residual strain) regions that extend continuously or intermittently in a direction intersecting with a rolling direction are formed substantially parallel to each other. The width of each linear strain region (width in the rolling direction) is 210 µm or less, and the intervals in the rolling direction of the linear strain regions adjacent to each other of the plurality of linear strain regions are each 10 mm or less.

Hereinafter, the grain-oriented electrical steel sheet according to the present embodiment will be described.

<Base Steel Sheet>

(Chemical Composition)

The grain-oriented electrical steel sheet according to the present embodiment is largely characterized by the strain regions (linear strain regions) and a compound phase in the glass coating, and the base steel sheet in the grain-oriented electrical steel sheet is not limited in terms of the chemical composition, which may be in a well-known range. For example, in order to obtain characteristics that are ordinarily required as grain-oriented electrical steel sheets, the chemical composition preferably contains the followings. In the present embodiment, "%" relating to the chemical composition is "mass %" unless otherwise specified.

C: 0.010% or Less

C (carbon) is an element effective for the microstructure control of the steel sheet in steps until the completion of a decarburization annealing step in manufacturing steps. However, when the C content exceeds 0.010%, the magnetic characteristics of the grain-oriented electrical steel sheet, which is a product sheet, deteriorate. Therefore, in the base steel sheet of the grain-oriented electrical steel sheet according to the present embodiment, the C content is preferably set to 0.010% or less. The C content is more preferably 0.005% or less. The C content is preferably as low as possible; however, even when the C content is reduced to less than 0.0001%, the effect of the microstructure control is saturated, and only the manufacturing cost increases. Therefore, the C content may be set to 0.0001% or more.

Si: 3.00% to 4.00%

Si (silicon) is an element that improves the iron loss characteristics by increasing the electric resistance of the grain-oriented electrical steel sheet. When the Si content is less than 3.00%, a sufficient effect of reducing an eddy-current loss cannot be obtained. Therefore, the Si content is preferably set to 3.00% or more. The Si content is more preferably 3.10% or more and still more preferably 3.20% or more.

On the other hand, when the Si content exceeds 4.00%, the grain-oriented electrical steel sheet is embrittled, and the passability significantly deteriorates. In addition, the workability of the grain-oriented electrical steel sheet deteriorates, and the steel sheet may break during rolling. Therefore, the Si content is preferably set to 4.00% or less. The Si content is more preferably 3.80% or less and still more preferably 3.70% or less.

Mn: 0.01% to 0.50%

Mn (manganese) is an element that bonds to S to form MnS during the manufacturing steps. These precipitates function as an inhibitor (an inhibitor of normal grain growth) and develop secondary recrystallization in steel. Mn is also an element that further enhances the hot workability of steel. In a case where the Mn content is less than 0.01%, it is not possible to sufficiently obtain the above-described effect. Therefore, the Mn content is preferably set to 0.01% or more. The Mn content is more preferably 0.02% or more.

On the other hand, when the Mn content exceeds 0.50%, secondary recrystallization is not developed, and the magnetic characteristics of steel deteriorate. Therefore, in the base steel sheet of the grain-oriented electrical steel sheet according to the present embodiment, the Mn content is preferably set to 0.50% or less. The Mn content is more preferably 0.20% or less and still more preferably 0.10% or less.

N: 0.010% or Less

N (nitrogen) is an element that bonds to Al to form AlN, which functions as an inhibitor in the manufacturing steps. However, when the N content exceeds 0.010%, the magnetic characteristics deteriorate due to an inhibitor excessively remaining in the base steel sheet. Therefore, in the base steel sheet of the grain-oriented electrical steel sheet according to the present embodiment, the N content is preferably set to 0.010% or less. The N content is more preferably 0.008% or less.

On the other hand, the lower limit of the N content is not particularly specified; however, even when the N content is reduced to less than 0.001%, only the manufacturing cost increases. Therefore, the N content may be set to 0.001% or more.

Sol. Al: 0.020% or Less, sol. Al (acid-soluble aluminum) is an element that bonds to N to form AlN that functions as an inhibitor during the manufacturing steps of the grain-oriented electrical steel sheet. However, when the sol. Al content of the base steel sheet exceeds 0.020%, the magnetic characteristics deteriorate due to the inhibitor excessively remaining in the base steel sheet. Therefore, in the base steel sheet of the grain-oriented electrical steel sheet according to the present embodiment, the sol. Al content is preferably set to 0.020% or less. The sol. Al content is more preferably 0.010% or less and still more preferably less than 0.001%. The lower limit of the sol. Al content is not particularly specified; however, even when the sol. Al content is reduced to less than 0.0001%, only the manufacturing cost increases. Therefore, the Sol. Al content may be set to 0.0001% or more.

S: 0.010% or Less

S (sulfur) is an element that bonds to Mn to form MnS that functions as an inhibitor in the manufacturing steps. However, in a case where the S content exceeds 0.010%, the magnetic characteristics deteriorate due to an excessively remaining inhibitor. Therefore, in the base steel sheet of the grain-oriented electrical steel sheet according to the present embodiment, the S content is preferably set to 0.010% or less. The S content in the grain-oriented electrical steel sheet is preferably as low as possible. For example, the S content is less than 0.001%. However, even when the S content in the grain-oriented electrical steel sheet is reduced to less than 0.0001%, only the manufacturing cost increases. Therefore, the S content in the grain-oriented electrical steel sheet may be 0.0001% or more.

P: 0.030% or Less

P (phosphorus) is an element that degrades the workability in rolling. When the P content is set to 0.030% or less, it is possible to suppress excessive deterioration of the rolling workability and to suppress breakage during manufacturing. From such a viewpoint, the P content is preferably set to 0.030% or less. The P content is more preferably 0.020% or less and still more preferably 0.010% or less.

The lower limit of the P content may be 0%; however, the detection limit of chemical analysis is 0.0001%, and thus the substantial lower limit of the P content in practical steel sheets is 0.0001%. In addition. P is also an element having an effect of improving the texture and improving the magnetic characteristics. In order to obtain this effect, the P content may be set to 0.001% or more or may be set to 0.005% or more.

Remainder: Fe and Impurities

The chemical composition of the base steel sheet of the grain-oriented electrical steel sheet according to the present embodiment contains the above-described elements, and the remainder may be Fe and impurities. However, for the purpose of enhancing the magnetic characteristics and the like, Cu, Cr, Sn, Se, Sb, and Mo may be further contained in ranges to be shown below. These elements are also allowed to be contained as impurities.

In addition, even when, for example, any one or more of W, Nb, Ti, Ni, Bi, Co, and V are contained in a total of 1.0% or less as elements other than these, the effect of the grain-oriented electrical steel sheet according to the present embodiment is not impaired.

Here, the impurities are elements that are incorporated from ore or scraps as a raw material, manufacturing environments, or the like at the time of industrially manufacturing the base steel sheet and are allowed to be contained in contents at which the action of the grain-oriented electrical steel sheet according to the present embodiment is not adversely affected.

Cr: 0% to 0.50%

Cr (chromium) is an element that contributes to an increase in the Goss orientation occupancy ratio in the secondary recrystallization structure to improve the magnetic characteristics. In order to obtain the above-described effect, the Cr content is preferably set to 0.01% or more, more preferably set to 0.02% or more, and still more preferably set to 0.03% or more.

On the other hand, in a case where the Cr content exceeds 0.50%, a Cr oxide is formed, and the magnetic characteristics deteriorate. Therefore, the Cr content is preferably set to 0.50% or less. The Cr content is more preferably 0.30% or less and still more preferably 0.10% or less.

Sn: 0% to 0.50%

Sn (tin) is an element that contributes to improvement in the magnetic characteristics through the control of the primary recrystallization structure. In order to obtain the magnetic characteristics improvement effect, the Sn content is preferably set to 0.01% or more. The Sn content is more preferably 0.02% or more and still more preferably 0.03% or more.

On the other hand, in a case where the Sn content exceeds 0.50%, secondary recrystallization becomes unstable, and the magnetic characteristics deteriorate. Therefore, the Sn content is preferably set to 0.50% or less. The Sn content is more preferably 0.30% or less and still more preferably 0.10% or less.

Cu: 0% to 0.50%

Cu (copper) is an element that contributes to an increase in the Goss orientation occupancy rate in the secondary recrystallization structure. Cu is an optional element in the base steel sheet according to the present embodiment. Therefore, the lower limit of the content becomes 0%; however, in order to obtain the above-described effect, the Cu content is preferably set to 0.01% or more. The Cu content is more preferably 0.02% or more and still more preferably 0.03% or more.

On the other hand, in a case where the Cu content exceeds 0.50%, the steel sheet is embrittled during hot rolling. Therefore, in the base steel sheet of the grain-oriented electrical steel sheet according to the present embodiment, the Cu content is preferably set to 0.50% or less. The Cu content is more preferably 0.30% or less and still more preferably 0.10% or less.

Se: 0% to 0.020%

Se (selenium) is an element having an effect of improving the magnetic characteristics. Therefore, Se may be contained. In a case where Se is contained, the content is preferably set to 0.001% or more in order to favorably exhibit the effect of improving the magnetic characteristics. The Se content is preferably 0.003% or more and more preferably 0.006% or more.

On the other hand, when the Se content exceeds 0.020%, the adhesion of the glass coating deteriorates. Therefore, the Se content is preferably set to 0.020% or less. The Se content is more preferably 0.015% or less and more preferably 0.010% or less.

Sb: 0% to 0.500%

Sb (antimony) is an element having an effect of improving the magnetic characteristics. Therefore, Sb may be contained. In a case where Sb is contained, the content is preferably set to 0.005% or more in order to favorably exhibit the effect of improving the magnetic characteristics. The Sb content is more preferably 0.010% or more and still more preferably 0.020% or more.

On the other hand, when the Sb content exceeds 0.500%, the adhesion of the glass coating significantly deteriorates. Therefore, the Sb content is preferably set to 0.500% or less. The Sb content is more preferably 0.300% or less and still more preferably 0.100% or less.

Mo: 0% to 0.10%

Mo (molybdenum) is an element having an effect of improving the magnetic characteristics. Therefore, Mo may be contained. In a case where Mo is contained, the Mo content is preferably set to 0.01% or more in order to favorably exhibit the effect of improving the magnetic characteristics. The Mo content is more preferably 0.02% or more and still more preferably 0.03% or more.

On the other hand, when the Mo content exceeds 0.10%, the cold rollability deteriorates, and there is a possibility that the base steel sheet may break. Therefore, the Mo content is preferably set to 0.10% or less. The Mo content is more preferably 0.08% or less and still more preferably 0.05% or less.

As described above, it is exemplified that the chemical composition of the base steel sheet of the grain-oriented electrical steel sheet according to the present embodiment contains the above-described essential elements with the remainder consisting of Fe and impurities or the chemical composition contains the above-described essential elements and further contains one or more of the optional elements with the remainder consisting of Fe and impurities.

The chemical composition of the base steel sheet of the grain-oriented electrical steel sheet according to the present embodiment can be measured after the glass coating and the tension-applied insulation coating formed on the surface are removed.

Specifically, the grain-oriented electrical steel sheet is immersed in a sodium hydroxide aqueous solution (80° C. to 90° C.) containing NaOH: 30 to 50 mass % and $H_2O$: 50 to 70 mass % for 7 to 10 minutes, whereby the tension-applied insulation coating is removed.

The grain-oriented electrical steel sheet from which the tension-applied insulation coating has been removed is washed with water and, after being washed with water, dried with a warm air blower for a little less than 1 minute. The dried grain-oriented electrical steel sheet (the grain-oriented electrical steel sheet not including the tension-applied insulation coating) is immersed in a hydrochloric acid aqueous solution (80° C. to 90° C.) containing 30 to 40 mass % of HCl for 1 to 10 minutes, whereby the glass coating is removed.

The base steel sheet after immersion is washed with water and, after being washed with water, dried with a warm air blower for a little less than 1 minute.

The base steel sheet can be taken out from the grain-oriented electrical steel sheet by the above-described step.

The chemical composition of such a base steel sheet is obtained by a well-known component analysis method. Specifically, chips are generated from the base steel sheet using a drill, the chips are collected, and the collected chips are dissolved in an acid to obtain a solution. ICP-AES is performed on the solution to perform an elemental analysis of the chemical composition.

Here. Si in the chemical composition of the base steel sheet is obtained by a method specified in JIS G 1212 (1997) (Methods for Determination of Silicon Content). Specifically, when the above-described chips are dissolved in an acid, silicon oxide precipitates as a precipitate, and thus this precipitate (silicon oxide) is filtered out with filter paper, and the mass is measured, thereby obtaining the Si content.

The C content and the S content are obtained by a well-known high-frequency combustion method (combustion-infrared absorption method). Specifically, the above-described solution is combusted by high-frequency heating in an oxygen stream, carbon dioxide and sulfur dioxide generated are detected, and the C content and the S content are obtained.

The N content is obtained using a well-known inert gas melting-thermal conductivity method.

(Strain Regions)

In the base steel sheet included in the grain-oriented electrical steel sheet according to the present embodiment, a plurality of linear strain regions (residual strain regions) formed by energy ray irradiation are present.

The plurality of linear strain regions extend in a direction intersecting with the rolling direction on the surface of the base steel sheet, the strain regions are each parallel to each other (a deviation of approximately 5° is allowed in actual manufacturing), the widths in the rolling direction are 210 µm or less, and the individual linear strain regions adjacent to each other are formed at intervals of 10 mm or less in the rolling direction. When the strain regions are made to be present as described above, a favorable iron loss/noise balance can be obtained.

Places where strain is present can be analyzed using a residual strain measurement technique by an X-ray diffraction method (for example, K. Iwata, et. al, J. Appl. Phys. 117. 17A910 (2015)). In addition, in a case where an energy ray irradiation mark can be confirmed on the surface of the steel sheet, the irradiation mark may be determined as a strain region.

In addition, it is known that, particularly in a case where these strains (residual strains) are compressive strains in the rolling direction and tensile strains in the sheet thickness direction, regions magnetized in the sheet thickness direction, which are called closure domains, are formed in regions where the strain is present (strain regions).

In the present embodiment, the fact that the linear strains extend in a direction intersecting with the rolling direction indicates that the extension directions of the strain regions are within a range of 30° or less in terms of the deviation angle with respect to a direction perpendicular to the rolling direction. When the extension direction deviates from this angular range, the 180° magnetic domain segmentation action of the steel sheet becomes weak, and a sufficient iron loss reduction effect cannot be obtained.

The strain region may be continuously present in a linear shape or may be present to intermittently extend in one direction (for example, in a dotted-line shape), but is preferably present continuously from the viewpoint of improvement in iron loss. The linear strain regions are formed by irradiation with an energy ray. The kind of the energy ray is not particularly limited, but a laser or an electron beam, which has been ordinarily put into practical use, is preferable. In the case of irradiation with an electron beam, it is necessary to set the atmosphere at the time of electron beam irradiation to a vacuum having a degree of vacuum of a certain value or less, which creates a concern of an increase in the production cost.

In addition, when the intervals in the rolling direction of the plurality of linear strain regions adjacent to each other are more than 10 mm, the magnetic domain segmentation effect of 180° magnetic domains becomes weak, and thus the iron loss improvement effect is insufficient. Therefore, each of the intervals of linear strain regions adjacent to each other in the rolling direction is set to 10 mm or less. It is preferable that the intervals of the plurality of linear strain regions are substantially equal intervals.

When the irradiation pitches become narrow, basically, the iron loss becomes small; however, when the irradiation pitches are made to be excessively small, the magnetic domain segmentation effect is saturated, the eddy-current loss rarely decreases, an increase in the hysteresis loss due to the strains becomes significant, and the iron loss deteriorates. In addition, there are cases where the noise characteristics deteriorate. Therefore, each of the intervals of linear strain regions adjacent to each other in the rolling direction is preferably set to 3 mm or more.

Here, the interval in the rolling direction of strain regions adjacent to each other is the distance between the center of a linear strain region and the center of an adjacent linear strain region in the rolling direction.

The length of the strain in the sheet width direction is not limited, but the strain is preferably formed from one end to the other end of the base steel sheet in the width direction. In a case where the steel sheet is irradiated discontinuously (intermittently) with an energy ray, at the time of irradiating the steel sheet with the energy ray in the width direction at specific pitches, a major axis (length along the width direction) d0 of an energy ray-irradiated portion and a length dl along the width direction between energy ray non-irradiated portions each sandwiched by two energy ray-irradiated portions need to satisfy dl≤3×d0. d0 may be in a range of 50 µm or more and 50 mm or less.

In addition, when the proportion of the strain regions on the surface of the base steel sheet becomes excessively large, the strains in the entire base steel sheet increase, the total hysteresis loss increases, the iron loss deteriorates, and the noise characteristics deteriorate. Therefore, the widths of the strain regions are set to 210 µm or less. The widths are preferably 200 µm or less, more preferably 150 µm or less, and still more preferably 100 µm or less.

In the grain-oriented electrical steel sheet according to the present embodiment, furthermore, the state relating to strain is specified by the amount of a change in magnetostriction when a specific heat treatment has been performed. Specifically, magnetostriction $\lambda_{0\text{-}pb}$ when the grain-oriented electrical steel sheet is excited up to 1.7 T and magnetostriction $\lambda_{0\text{-}pa}$ when the grain-oriented electrical steel sheet is heat-treated at 800° C. for 4 hours and then excited up to 1.7 T satisfy the following expression (1).

$$0.02 \leq \lambda_{0\text{-}pb} - \lambda_{0\text{-}pa} \leq 0.20 (\mu m/m) \quad (1)$$

In a case where the expression (1) is satisfied, it becomes possible to ensure a favorable iron loss/noise balance.

This expression is basically considered to become an expression that evaluates strain that has been introduced into the base steel sheet by energy ray irradiation together with not only the amount of strain but also the distribution of strain, furthermore, the state of lattice defects that configure the strains or the like. When strain that is released by the heat treatment at 800° C. for 4 hours is set as a strain that is in the range of the expression (1) in relation to magnetostriction, it becomes possible to realize a favorable iron loss/noise balance.

The fact that the change in magnetostriction before and after the heat treatment is less than 0.02 μm/m means that, at the time of energy ray irradiation, an appropriate amount of strain has not yet been introduced or a strain state where strain release by the heat treatment is difficult to occur has been formed. In this case, a favorable iron loss/noise balance cannot be obtained. On the other hand, the fact that the change in magnetostriction before and after the heat treatment is more than 0.20 μm/m means that, at the time of energy ray irradiation, an excessive amount of strain has been introduced or a strain state where strain release by the heat treatment is excessively easy to occur has been formed. In this case as well, a favorable iron loss/noise balance cannot be obtained.

<Glass Coating>

In the grain-oriented electrical steel sheet according to the present embodiment, a glass coating is formed on the surface of the base steel sheet.

The glass coating is an inorganic coating containing magnesium silicate as a main component. The glass coating is formed by a reaction between an annealing separating agent containing magnesia (MgO) applied to the surface of the base steel sheet and a component on the surface of the base steel sheet during final annealing, has a composition derived from the annealing separating agent and the component of the base steel sheet, and is formed of a structure including a $Mg_2SiO_4$ phase that is a primary phase (50 area % or more) and a $MgAl_2O_4$ phase. There are cases where, in addition to these phases, approximately 1% or less of a precipitate may be contained.

The region (area ratio) that is occupied by each phase is determined from the composition of an oxide obtained with an energy dispersive X-ray analyzer attached to a scanning electron microscope in the sheet thickness cross-sectional observation of the glass coating. A region in which Mg, Al, and O are present and the Al concentration is 5% or more is regarded as the $MgAl_2O_4$ phase, and a region in which the Si concentration is 5% or more is regarded as the $Mg_2SiO_4$ phase.

In the grain-oriented electrical steel sheet according to the present embodiment, the compound phase that configures the glass coating preferably has a predetermined structure. Specifically, in a cross section in the sheet thickness direction of the grain-oriented electrical steel sheet, when the glass coating is divided into 3 regions having an equal thickness in the sheet thickness direction, each region is designated as a 1/3 region, a 2/3 region, and a 3/3 region from the base steel sheet side toward the surface of the steel sheet, furthermore, the area ratio of a $MgAl_2O_4$ phase in the 1/3 region is denoted by S1, the area ratio of the $MgAl_2O_4$ phase in the 2/3 region is denoted by S2, and the area ratio of the $MgAl_2O_4$ phase in the 3/3 region is denoted by S3, the following formulae (2) to (4) are preferably satisfied.

In the cross-sectional observation, severe unevenness or separated island-like regions are also observed at the front end of the glass coating. In the present embodiment, a sufficient length of 20 mm or more in a direction parallel to the surface of the steel sheet is observed, the distance between a position where the glass coating penetrates deepest into the base steel sheet and the outermost surface of the steel sheet in the sheet thickness direction at a position where the glass coating is present is defined as the overall thickness of the glass coating, and (the thicknesses of) the 1/3 region, the 2/3 region, and the 3/3 region are determined. In addition, in the calculation of the area ratio of the $MgAl_2O_4$ phase in each region, the total area of the individual regions, which serves as the denominator, is a "region that is the glass coating" including an island-like region. That is, in the 1/3 region, which is the glass coating front end region, the "region that is the glass coating" is likely to be a severely uneven shape or a separated island-like region, in the same thickness range, not a small amount of a Fe phase is present; however, in the calculation of the area ratio of the $MgAl_2O_4$ phase, the Fe phase region is not included in the region area (total area), which serves as the denominator. Therefore, the total area of the 1/3 region is ordinarily smaller than the total area of the 2/3 region or the 3/3 region.

$$S1 > S2 > S3 \quad (2)$$

$$(S1+S2+S3)/3 < 0.50 \quad (3)$$

$$S3 < 0.10 \quad (4)$$

In a case where the expressions (2) to (4) are satisfied, it is indicated that the $MgAl_2O_4$ phase, which is a mixed phase, is unevenly distributed on the base steel sheet side in the glass coating.

In the 1/3 region, the $MgAl_2O_4$ phase is a compound phase that improves the adhesion of the coating. In the glass coating, the 1/3 region is a region that is joined to the base steel sheet. The interface between the glass coating and the base steel sheet exhibits a complicated uneven shape, which is also ordinarily expressed as a "root". Due to this form, the glass coating and the base steel sheet are strongly bonded by a so-called anchoring effect. Therefore, even when the $MgAl_2O_4$ phase is present in this region in a mixed form to a certain extent, cracks, which may act as the starting point of coating exfoliation, are less likely to be generated.

Therefore, it is preferable that the $MgAl_2O_4$ phase is unevenly distributed in the 1/3 region of the glass coating. From the viewpoint of adhesion, even in the 1/3 region, a form where the $MgAl_2O_4$ phase is unevenly distributed on the base steel sheet side as much as possible is preferable, and a form where the $MgAl_2O_4$ phase is unevenly distributed (only) in the interface between the glass coating and the base steel sheet can be said to be one of the most preferable forms.

On the other hand, in the 3/3 region, the $MgAl_2O_4$ phase is a compound phase the formation of which should to be avoided. When the $MgAl_2O_4$ phase is present in the 3/3 region of the glass coating, the $MgAl_2O_4$ phase becomes the starting point for the generation of cracks, and the coating adhesion significantly deteriorates. Therefore, S3<0.10 is preferable, S3<0.05 is more preferable, and S3=0 is the most preferable form. In addition, when the proportion of the $MgAl_2O_4$ phase in the whole becomes 0.50 or more, a starting point of exfoliation is generated between the $MgAl_2O_4$ phase and the $Mg_2SiO_4$ phase. Therefore, the area ratio (S1+S2+S3)/3 of the $MgAl_2O_4$ phase in the glass coating is preferably less than 0.50 and more preferably 0.30 or less.

When a primary coating has such a form, in a steel sheet having the above-described strains (the magnetostriction change by a heat treatment), it becomes possible to obtain more favorable coating adhesion while ensuring a favorable iron loss/noise balance. The reason therefor is not clear, but is considered as described below.

In the grain-oriented electrical steel sheet according to the present embodiment, a favorable iron loss/noise balance is realized under irradiation conditions represented by energy ray irradiation with a high input energy at a low power density, but coating exfoliation is also likely to occur from a laser-irradiated portion. This suggests that strains that are formed in the grain-oriented electrical steel sheet according to the present embodiment are different from strain distributions that have been thus far ordinary. Therefore, when stress acts on the grain-oriented electrical steel sheet, it is expected that higher exfoliation stress than before acts on the interface between the base steel sheet and the glass coating in the strain regions. It is considered that this exfoliation stress is relaxed by the $MgAl_2O_4$ phase unevenly distributed on the base steel sheet side in the glass coating. It is unclear whether this relaxation arises from the fact that stress generated due to the uneven distribution of different kinds of phases relaxes the exfoliation stress attributed to the residual strains or the fact that the uneven distribution of different kinds of phases itself has a strong resisting force against the exfoliation stress. However, when the fact that the coating adhesion improvement effect of the uneven distribution of the $MgAl_2O_4$ phases, which is specified in the present embodiment, significantly acts in magnetic domain control materials having strains shown in the present embodiment is taken into account, this combination is considered to have a special preferable interaction.

Furthermore, it can be considered that not only the energy ray irradiation conditions but also a possibility that the uneven distribution of the $MgAl_2O_4$ phase in the glass coating itself has a qualitative influence on the strains in the energy ray-irradiated portion and make the iron loss/noise balance more preferable. Regarding the elucidation of the influence of the interaction between strains and the glass coating form on the iron loss/noise balance or adhesion, detailed analyses in the future are expected.

The grain-oriented electrical steel sheet according to the present embodiment is a grain-oriented electrical steel sheet that has realized a favorable iron loss/noise balance under irradiation conditions represented by energy ray irradiation with a high input energy at a low power density, but sufficient coating adhesion can be obtained. Specifically, when the grain-oriented electrical steel sheet is wound around a round bar having a diameter of 20 mm and bent back, the coating residual area ratio becomes 90% to 100%. This coating residual area ratio becomes an index that indicates whether the coating adhesion is favorable or poor. The coating residual area ratio is preferably 95% or more.

The coating residual area ratio is evaluated by performing a bending adhesion test. An 80 mm×80 mm flat sheet-like test piece collected from a coating-attached grain-oriented electrical steel sheet is coiled around a round bar having a diameter of 20 mm and then elongated flat, the area of the coating that does not exfoliate from this electrical steel sheet (a glass coating and/or a tension insulation coating) is measured, and a value obtained by dividing the area of the coating that does not exfoliate by the area of the steel sheet is defined as the coating residual area ratio (%). For example, the area of the coating that does not exfoliate may be measured by placing a transparent film having a 1 mm grid scale on the test piece.

<Tension-Applied Insulation Coating>

In the grain-oriented electrical steel sheet according to the present embodiment, a tension-applied insulation coating is formed on the surface of the glass coating.

The tension-applied insulation coating applies electrical insulation properties to the grain-oriented electrical steel sheet, thereby reducing the eddy-current loss to improve the iron loss of the grain-oriented electrical steel sheet. In addition, according to the tension-applied insulation coating, in addition to the electrical insulation properties as described above, a variety of characteristics such as corrosion resistance, heat resistance, and slip resistance can be obtained.

Furthermore, the tension-applied insulation coating has a function of applying tension to the grain-oriented electrical steel sheet. When tension is applied to the grain-oriented electrical steel sheet to facilitate domain wall movement in the grain-oriented electrical steel sheet, it is possible to improve the iron loss of the grain-oriented electrical steel sheet.

The tension-applied insulation coating may be a well-known coating that is formed by, for example, applying and baking a coating liquid containing metal phosphate and silica as main components on the surface of the glass coating.

<Sheet Thickness of Base Steel Sheet: 0.17 to 0.30 mm>

The sheet thickness of the base steel sheet of the grain-oriented electrical steel sheet according to the present embodiment is not limited, but is preferably 0.17 to 0.30 mm in the case of considering not only a low iron loss but also the application to cores of transformers, for which low noise and low vibration are required. As the sheet thickness is smaller, a more favorable effect of reducing the eddy-current loss can be acquired, and a more favorable iron loss can be obtained, and thus a preferable sheet thickness upper limit of the base steel sheet is 0.30 mm. However, in order to manufacture a base steel sheet of less than 0.17 mm, a special facility becomes necessary, which is not preferable in terms of production such as an increase in the manufacturing cost. Therefore, an industrially preferable lower limit of the sheet thickness is 0.17 mm.

<Manufacturing Method>

The grain-oriented electrical steel sheet according to the present embodiment can be manufactured by a manufacturing method including the following steps.

(i) A hot rolling step of heating a steel piece and hot rolling to obtain a hot-rolled steel sheet, (ii) a hot-rolled sheet annealing step of performing hot-rolled sheet annealing on the hot-rolled steel sheet.

(iii) a pickling step of pickling the hot-rolled steel sheet after the hot-rolled sheet annealing step, (iv) a cold rolling step of performing cold rolling once or a plurality of times (twice or more) with annealing therebetween on the hot-rolled steel sheet after the pickling step to obtain a cold-rolled steel sheet, (v) a decarburization annealing step of performing decarburization annealing on the cold-rolled steel sheet, (vi) a final annealing step of applying and drying an annealing separating agent containing a MgO powder as a main component onto the front and rear surfaces of the cold-rolled steel sheet after the decarburization annealing step, which is the base steel sheet, and performing final annealing to form glass coatings, (vii) a coating-forming step of forming tension-applied insulation coatings on the glass coating to obtain a grain-oriented electrical steel sheet including the base steel sheet, the glass coatings formed on the base steel sheet, and the tension-applied insulation coatings formed on the glass coatings, and (viii) a magnetic domain segmentation step of irradiating the surfaces of the tension-applied insulation coatings of the grain-oriented electrical steel sheet with an energy ray to form a plurality of linear strain regions on the base steel sheet.

In the method for manufacturing a grain-oriented electrical steel sheet according to the present embodiment, conditions in the magnetic domain segmentation step of controlling, particularly, the state of strains and conditions in the decarburization annealing step of controlling, particularly, the form of the $MgAl_2O_4$ phase in the glass coating become characteristics.

Hereinafter, these steps will be described in detail. In the following description, in a case where conditions in each step are not described, it is possible to perform each step by appropriately applying well-known conditions.

<Regarding Chemical Composition of Steel Piece>

The chemical composition of the steel piece that is subjected to a heating step is not limited; however, in order to obtain characteristics that are ordinarily required as grain-oriented electrical steel sheets, the chemical composition preferably contains the followings. In the following description, unless otherwise specified, the notation "%" represents "mass %". The steel piece is, for example, a slab.

C: 0.010% to 0.200%

C (carbon) is an element that exhibits an effect of improving the magnetic flux density. However, in a case where the C content of the steel piece exceeds 0.200%, steel undergoes phase transformation in secondary recrystallization annealing (that is, final annealing), secondary recrystallization does not sufficiently progress, and favorable magnetic flux density and iron loss characteristics cannot be obtained. Therefore, the C content of the steel piece is preferably set to 0.200% or less. The C content is preferably as small as possible in terms of the reduction of the iron loss. From the viewpoint of the reduction of the iron loss, the C content is more preferably 0.150% or less and still more preferably 0.100% or less.

On the other hand, in a case where the C content of the steel piece is less than 0.010%, it is not possible to obtain the effect of improving the magnetic flux density. Therefore, the C content of the steel piece is set to 0.010% or more. The C content is preferably 0.040% or more and more preferably 0.060% or more.

Si: 3.00% to 4.00%

Si (silicon) is an extremely effective element for increasing the electric resistance (specific resistance) of steel to reduce an eddy-current loss that configures a part of the iron loss. In a case where the Si content of the steel piece is less than 3.00%, steel undergoes phase transformation in secondary recrystallization annealing, secondary recrystallization does not sufficiently progress, and favorable magnetic flux density and iron loss characteristics cannot be obtained. Therefore, the Si content of the steel piece is preferably set to 3.00% or more. The Si content of the steel piece is more preferably 3.10% or more and still more preferably 3.20% or more.

On the other hand, in a case where the Si content exceeds 4.00%, the steel sheet is embrittled, and the passability in manufacturing steps significantly deteriorates. Therefore, the Si content of the steel piece is preferably set to 4.00% or less. The Si content of the steel piece is more preferably 3.80% or less and still more preferably 3.60% or less.

sol. Al: 0.010% to 0.040% sol. Al (acid-soluble aluminum) is a constituent element of a major inhibitor among compounds called inhibitors that influence secondary recrystallization in the grain-oriented electrical steel sheet, and is an essential element from the viewpoint of expression of secondary recrystallization in the base steel sheet according to the present embodiment. In a case where the sol. Al content of the steel piece is less than 0.010%, AlN, which functions as an inhibitor, is not sufficiently generated, secondary recrystallization becomes insufficient, and the iron loss characteristics do not improve. Therefore, in the steel piece, the sol. Al content is preferably set to 0.010% or more. The sol. Al content is more preferably 0.015% or more and still more preferably 0.020%.

On the other hand, in a case where the sol. Al content exceeds 0.040%, embrittlement of the steel sheet becomes significant. Therefore, the sol. Al content of the steel piece is preferably set to 0.040% or less. The sol. Al content is more preferably 0.035% or less and still more preferably 0.030% or less.

Mn: 0.01% to 0.50%

Mn (manganese) is an important element that forms MnS, which is one of the major inhibitors. In a case where the Mn content of the steel piece is less than 0.01%, the absolute amount of MnS, which is necessary to cause secondary recrystallization, is insufficient. Therefore, the Mn content of the steel piece is preferably set to 0.01% or more. The Mn content is more preferably 0.03% or more and more preferably 0.06% or more.

On the other hand, in a case where the Mn content of the steel piece exceeds 0.50%, steel undergoes phase transformation in secondary recrystallization annealing, secondary recrystallization does not sufficiently progress, and favorable magnetic flux density and iron loss characteristics cannot be obtained. Therefore, the Mn content of the steel piece is set to 0.50% or less. The Mn content is more preferably 0.40% or less and still more preferably 0.30% or less.

N: 0.020% or Less

N (nitrogen) is an element that reacts with the acid-soluble Al to form AlN, which functions as an inhibitor. In a case where the N content of the steel piece exceeds 0.020%, blisters (vacancies) are formed in the steel sheet during cold rolling, the strength increases, and the passability during manufacturing deteriorates. Therefore, the N content of the steel piece is preferably set to 0.020% or less. The N content is more preferably 0.015% or less and still more preferably 0.010% or less. When AlN is not utilized as an inhibitor, the lower limit of the N content may include 0%. However, the detection limit of chemical analysis is 0.0001%, and thus the substantial lower limit of the N content in practical steel sheets is 0.0001%. On the other hand, in order for N to bond to Al to form AlN, which functions as an inhibitor, the N content of the steel piece is preferably 0.001% or more and more preferably 0.005% or more.

S: 0.005% to 0.040%

S (sulfur) is an important element that forms MnS, which is an inhibitor, by reacting with the Mn. In a case where the S content of the steel piece is less than 0.005%, it is not possible to obtain a sufficient inhibitory effect. Therefore, the S content of the steel piece is preferably set to 0.005% or more. The S content is more preferably 0.010% or more and still more preferably 0.020% or more.

On the other hand, in a case where the S content of the steel piece exceeds 0.040%, S becomes a cause of hot embrittlement, and hot rolling becomes significantly difficult. Therefore, the S content of the steel piece is preferably set to 0.040% or less. The S content is more preferably 0.035% or less and still more preferably 0.030% or less.

P: 0.030% or Less

P (phosphorus) is an element that degrades the workability in rolling. When the P content is set to 0.030% or less, it is possible to suppress excessive deterioration of the rolling workability and to suppress breakage during manufacturing. From such a viewpoint, the P content is preferably set to 0.030% or less. The P content is more preferably 0.020% or less and still more preferably 0.010% or less.

The lower limit of the P content may be 0%; however, the detection limit of chemical analysis is 0.0001%, and thus the substantial lower limit of the P content in practical steel sheets is 0.0001%. In addition, P is also an element having an effect of improving the texture and improving the magnetic characteristics. In order to obtain this effect, the P content may be set to 0.001% or more or may be set to 0.005% or more.

Remainder: Fe and Impurities

For the chemical composition of the steel piece that is used for the manufacturing of the grain-oriented electrical steel sheet according to the present embodiment, it is basic that the above-described elements are contained and the remainder is Fe and impurities. However, for the purpose of enhancing the magnetic characteristics and the like, Cu, Cr, Sn, Se, Sb, and Mo may be further contained in ranges to be shown below.

Here, the impurities are elements that are incorporated from ore or scraps as a raw material, manufacturing environments, or the like at the time of industrially manufacturing the base steel sheet and are allowed to be contained in contents at which the action of the grain-oriented electrical steel sheet according to the present embodiment is not adversely affected.

Cu: 0% to 0.50%

Cu (copper) is an element that contributes to an increase in the Goss orientation occupancy rate in the secondary recrystallization structure and also contributes to improvement in the adhesion of the glass coating. In the case of obtaining the above-described effect, the Cu content is preferably set to 0.02% or more. The Cu content is more preferably 0.03% or more.

On the other hand, in a case where the Cu content exceeds 0.50%, the steel sheet is embrittled during hot rolling. Therefore, the Cu content of the steel piece is preferably set to 0.50% or less. The Cu content is more preferably 0.30% or less and still more preferably 0.10% or less.

Cr: 0% to 0.50%

Cr (chromium) is, similar to Sn, which will be described below, and Cu, an element that contributes to an increase in the Goss orientation occupancy rate in the secondary recrystallization structure to improve the magnetic characteristics and also contributes to improvement in the adhesion of the glass coating. In order to obtain the above-described effects, the Cr content is preferably set to 0.02% or more and more preferably set to 0.03% or more.

On the other hand, in a case where the Cr content exceeds 0.50%, a Cr oxide is formed, and the magnetic characteristics deteriorate. Therefore, the Cr content is preferably set to 0.50% or less. The Cr content is more preferably 0.30% or less and still more preferably 0.10% or less.

Sn: 0% to 0.50%

Sn (tin) is an element having an effect of improving the magnetic characteristics. Therefore, Sn may be contained. In a case where Sn is contained, the content is preferably set to 0.005% or more in order to favorably exhibit the effect of improving the magnetic characteristics. In consideration of satisfying both the magnetic characteristics and the coating adhesion, the Sn content is preferably 0.02% or more and more preferably 0.03% or more.

On the other hand, when the Sn content exceeds 0.50%, the adhesion of the glass coating significantly deteriorates. Therefore, the Sn content is preferably set to 0.50% or less. The Sn content is more preferably 0.30% or less and still more preferably 0.10% or less.

Se: 0% to 0.020%

Se (selenium) is an element having an effect of improving the magnetic characteristics. Therefore, Se may be contained. In a case where Se is contained, the content is preferably set to 0.001% or more in order to favorably exhibit the effect of improving the magnetic characteristics. In consideration of satisfying both the magnetic characteristics and the coating adhesion, the Se content is more preferably 0.003% or more and still more preferably 0.006% or more.

On the other hand, when the Se content exceeds 0.020%, the glass coating significantly deteriorates. Therefore, the upper limit of the Se content is preferably set to 0.020%. The Se content is more preferably 0.015% or less and still more preferably 0.010% or less.

Sb: 0% to 0.500%

Sb (antimony) is an element having an effect of improving the magnetic characteristics. Therefore, Sn may be contained. In a case where Sb is contained, the content is preferably set to 0.001% or more in order to favorably exhibit the effect of improving the magnetic characteristics. In consideration of satisfying both the magnetic characteristics and the coating adhesion, the Sb content is more preferably 0.005% or more and still more preferably 0.010% or more.

On the other hand, when the Sb content exceeds 0.500%, the glass coating significantly deteriorates. Therefore, the upper limit of the Sb content is preferably set to 0.500%. The Sb content is more preferably 0.300% or less and still more preferably 0.100% or less.

Mo: 0% to 0.10%

Mo (molybdenum) is an element having an effect of improving the magnetic characteristics. Therefore, Mo may be contained. In a case where Mo is contained, the Mo content is preferably set to 0.01% or more in order to favorably exhibit the effect of improving the magnetic characteristics. The Mo content is more preferably 0.02% or more and still more preferably 0.03% or more.

On the other hand, when the Mo content exceeds 0.10%, the cold rollability deteriorates, and there is a possibility that the base steel sheet may break. Therefore, the Mo content is preferably set to 0.10% or less. The Mo content is more preferably 0.08% or less and still more preferably 0.05% or less.

<Hot Rolling Step>

In the hot rolling step, the steel piece having the predetermined chemical composition is heated and then hot-rolled to obtain a hot-rolled steel sheet. The heating temperature of the steel piece is preferably set within a range of 1100° C. to 1450° C. The heating temperature is more preferably 1300° C. to 1400° C.

The hot rolling conditions are not particularly limited and may be set as appropriate based on characteristics to be required. The sheet thickness of the hot-rolled steel sheet is preferably in a range of, for example, 2.0 mm or more and 3.0 mm or less.

<Hot-Rolled Sheet Annealing Step>

The hot-rolled sheet annealing step is a step of annealing the hot-rolled steel sheet manufactured through the hot rolling step to obtain a hot-rolled and annealed steel sheet. When such an annealing treatment is performed, recrystallization occurs in the steel sheet structure, and it becomes possible to realize favorable magnetic characteristics.

In the hot-rolled sheet annealing step according to the present embodiment, the hot-rolled steel sheet manufactured through the hot rolling step may be annealed according to a well-known method to obtain a hot-rolled and annealed steel sheet. Means for heating the hot-rolled steel sheet upon annealing is not particularly limited, and it is possible to adopt a well-known heating method. In addition, the annealing conditions are also not particularly limited, and it is possible to anneal the hot-rolled steel sheet, for example, within a temperature range of 900° C. to 1200° C. for 10 seconds to 5 minutes.

<Cold Rolling Step>

In the cold rolling step, cold rolling including a plurality of passes is performed on the hot-rolled and annealed steel sheet after the hot-rolled sheet annealing to obtain a cold-rolled steel sheet having a sheet thickness of 0.17 to 0.30 mm. The cold rolling may be cold rolling that is performed once (a series of cold rolling not including process annealing), or a plurality of times of cold rolling including process annealing may be performed by stopping cold rolling and performing process annealing at least once or more before the final pass of the cold rolling step.

In a case where process annealing is performed, the cold-rolled steel sheet is preferably held at a temperature of 1000° C. to 1200° C. for 5 seconds or longer and 180 seconds or shorter. The annealing atmosphere is not particularly limited. The number of times of the process annealing is preferably 3 or less in consideration of the manufacturing cost.

In addition, before the cold rolling step, pickling may be performed on the surface of the hot-rolled and annealed steel sheet.

In the cold rolling step according to the present embodiment, the hot-rolled and annealed steel sheet may be cold-rolled according to a well-known method to obtain a cold-rolled steel sheet. For example, it is possible to make the final rolling reduction fall into a range of 80% or larger and 95% or smaller. In a case where the final rolling reduction is smaller than 80%, it is highly likely that Goss nuclei in which a {110}<001> orientation has a high development degree in the rolling direction cannot be obtained, which is not preferable. On the other hand, in a case where the final rolling reduction exceeds 95%, it is highly likely that secondary recrystallization becomes unstable in the final annealing step, which is a subsequent step, which is not preferable. When the final rolling reduction is made to fall into the above-described range, it is possible to obtain Goss nuclei in which a {110}<001> orientation has a high development degree in the rolling direction and to suppress secondary recrystallization becoming unstable.

The final rolling reduction is the cumulative rolling reduction of cold rolling and is the cumulative rolling reduction of cold rolling after final process annealing in a case where process annealing is performed.

<Decarburization Annealing Step>

The decarburization annealing step is an important step for controlling the state of the $MgAl_2O_4$ phase in the glass coating. In the case of forming the above-described presence state of the $MgAl_2O_4$ phase, in a temperature-raising process of the decarburization annealing step including the temperature-raising process and a soaking process, it is necessary that the temperature rising rate from 550° C. to 750° C. is set to 700 to 2,000° C./sec, the oxygen potential is set to 0.0001 to 0.0100, and the soaking process includes a first soaking process where the annealing temperature is set to 800° C. to 900° C. and the annealing time is set to 100 to 500 seconds in an atmosphere having an oxygen potential of 0.4 or more and 0.8 or less and a second soaking process where the annealing temperature is set to 850° C. or higher and 1,000° C. or lower and the annealing time is set to 5 seconds or longer and 100 seconds or shorter in an atmosphere having an oxygen potential of 0.1 or less.

The second soaking process (second heat treatment) may be performed after the temperature is once lowered after the first soaking process (first heat treatment) or may be continuously performed without lowering the temperature after the first heat treatment.

The reason for the state of the $MgAl_2O_4$ phase in the glass coating to become preferable as described above by performing the decarburization annealing in the above-described range is not clear, but is considered as described below.

The glass coating is formed by a reaction between MgO applied to the surface of the steel sheet before final annealing as the annealing separating agent and Si contained in the base steel sheet. As the reaction proceeds with the proceeding of the final annealing, the interface between the glass coating and the base steel sheet proceeds into the base steel sheet, and, finally, the front end of the glass coating on the base steel sheet side develops so as to exhibit such a complicated uneven shape as "root" described above.

In this process, the $MgAl_2O_4$ phase is formed by a reaction between MgO and Al in the base steel sheet, and, roughly, two paths are considered to be present for the formation. One path is a case where MgO in the annealing separating agent and Al that is supplied from the base steel sheet directly react with each other. The other path is a case where MgO in the annealing separating agent first reacts with Si derived from the base steel sheet to form a $Mg_2SiO_4$ phase and then the $Mg_2SiO_4$ phase further reacts with Al to change to the $MgAl_2O_4$ phase. In the former case, the $MgAl_2O_4$ phase is considered to occur at a relatively early stage in the glass coating-forming process. On the other hand, in the latter case, since Mg and O are once fixed as an oxide with Si, the formation of the $MgAl_2O_4$ phase is considered to occur at a relatively late stage in the glass coating-forming process. When the fact that the formation of the glass coating containing the $Mg_2SiO_4$ phase as the primary phase occurs in the end in a form where an oxidized region proceeds into the base steel sheet is taken into account, the $MgAl_2O_4$ phase formed at a relatively early stage is considered to be disposed so as to be left on the surface side of the glass coating. On the contrary, the $MgAl_2O_4$ phase that is formed at a relatively late stage is considered to be disposed on the interface side between the glass coating and the base steel sheet. When such a fact is taken into account, it is possible to presume that MgO present on the surface of the base steel sheet is preferably made to preferentially react with Si in the final annealing in order to retain the $MgAl_2O_4$ phase that is formed in the glass coating on the base steel sheet side.

It is considered that the decarburization annealing conditions of the present embodiment have become conditions for forming a sufficient amount of $SiO_2$ on the surface of the steel sheet for which the decarburization annealing step has ended. That is, when the surface of the steel sheet for which the decarburization annealing step has ended has been covered with a sufficient amount of $SiO_2$, in a case where an annealing separating agent containing MgO as a main component is further applied to the surface and the reaction of the annealing separating agent is begun by final annealing, MgO preferentially forms the $Mg_2SiO_4$ phase in the initial stage of the reaction. As a result, the presence state of the $MgAl_2O_4$ phase in the glass coating becomes preferable. On the contrary, in a case where the above-described decarburization annealing conditions are not satisfied, since a sufficient amount of $SiO_2$ is not present on the surface of the steel sheet for which the decarburization annealing step has ended, in a case where the reaction of the annealing separating agent is begun by final annealing. MgO directly reacts with the base steel sheet containing Al at the initial stage of the reaction and forms the $MgAl_2O_4$ phase. As a result, the presence state of the $MgAl_2O_4$ phase in the glass coating does not become preferable.

Through the above-described thermal history in the decarburization annealing step, the glass coating that is formed on the surface of the base steel sheet thereafter becomes a preferable form, and it becomes possible to manufacture a grain-oriented electrical steel sheet having a favorable iron loss/noise balance and more excellent coating adhesion by performing magnetic domain control under appropriate laser treatment conditions.

<Nitriding Treatment Step>

A nitriding treatment may be performed during the decarburization annealing step or after the decarburization annealing step and before the final annealing step to be described below.

In the nitriding treatment step, for example, the cold-rolled steel sheet after the soaking process of the decarburization annealing step is held at approximately 700° C. to 850° C. in a nitriding treatment atmosphere (an atmosphere containing a gas having a nitriding ability such as hydrogen, nitrogen, or ammonia). It is preferable to perform the nitriding treatment on the steel sheet so that the N content of the cold-rolled steel sheet becomes 40 to 1000 ppm on a mass basis. When the N content of the cold-rolled steel sheet after the nitriding treatment is less than 40 ppm, AlN is not sufficiently precipitated in the cold-rolled steel sheet, and there is a possibility that AlN may not function as an inhibitor. Therefore, in a case where AlN is utilized as an inhibitor, the N content of the cold-rolled steel sheet after the nitriding treatment is preferably set to 40 ppm or more.

On the other hand, in a case where the N content of the cold-rolled steel sheet exceeds 1000 ppm, AlN is excessively present in the steel sheet even after the completion of secondary recrystallization in the final annealing. Such AlN causes iron loss deterioration. Therefore, the N content of the cold-rolled steel sheet after the nitriding treatment is preferably set to 1000 ppm or less.

<Final Annealing Step>

In the final annealing step, a predetermined annealing separating agent is applied to the cold-rolled steel sheet obtained in the decarburization annealing step or further subjected to the nitriding treatment, and then final annealing is performed. The final annealing is ordinarily performed for a long time in a state where the steel sheet has been coiled in a coil shape. Therefore, prior to the final annealing, an annealing separating agent is applied to the cold-rolled steel sheet and dried for the purpose of preventing seizure between the inside and outside of the coil.

As the annealing separating agent to be applied, an annealing separating agent containing MgO as a main component (for example, containing 80 mass % or more of MgO) is used. The use of the annealing separating agent containing MgO as a main component makes it possible to form a glass coating on the surface of the base steel sheet. In a case where MgO is not a main component, no primary coating (glass coating) is formed. This is because the primary coating is a $Mg_2SiO_4$ or $MgAl_2O_4$ compound and Mg necessary for the formation reaction is deficient.

The final annealing may be performed under conditions that, for example, in an atmospheric gas containing hydrogen and nitrogen, the temperature is raised up to 1150° C. to 1250° C. and then the cold-rolled steel sheet is annealed for 10 to 60 hours.

<Insulation Coating-Forming Step>

In the insulation coating-forming step, a tension-applied insulation coating is formed on one surface or both surfaces of the cold-rolled steel sheet after final annealing. The conditions for forming the tension-applied insulation coating are not particularly limited, and a treatment liquid may be applied and dried by a well-known method using a well-known insulation coating treatment liquid. When the tension-applied insulation coating is formed on the surface of the steel sheet, it becomes possible to further improve the magnetic characteristics of the grain-oriented electrical steel sheet.

The surface of the steel sheet on which the insulation coating (tension-applied insulation coating) is to be formed may be a surface on which an optional pretreatment such as a degreasing treatment with an alkali or the like or a pickling treatment with hydrochloric acid, sulfuric acid, phosphoric acid, or the like has been performed before the application of the treatment liquid or may be a surface as final-annealed on which no pretreatments are performed.

The tension-applied insulation coating that is formed on the surface of the glass coating (that is formed on the base steel sheet through the glass coating) is not particularly limited as long as the tension-applied insulation coating can be used as an insulation coating of grain-oriented electrical steel sheets, and it is possible to use a well-known insulation coating. As such an insulation coating, composite insulation coatings containing an inorganic substance as a main component and further containing an organic substance are exemplary examples. Here, the composite insulation coating is an insulation coating containing at least any inorganic substance such as a metal chromic acid salt, a metal phosphate, colloidal silica, a Zr compound, or a Ti compound as a main component, in which fine particles of an organic resin are dispersed. Particularly, from the viewpoint of reducing the environmental load during manufacturing, which has been highly requested in recent years, an insulation coating for which a metal phosphate, a Zr or Ti coupling agent, or a carbonate or ammonium salt thereof is used as a starting material is preferably used.

<Magnetic Domain Segmentation Step>

In the magnetic domain segmentation step, the surface of the tension-applied insulation coating is irradiated with an energy ray, thereby introducing a plurality of linear strains that extend in a direction intersecting with the rolling direction into the surface of the base steel sheet. In the magnetic domain segmentation step, regions (strain regions) where the plurality of linear strains (thermal strains generated by rapid heating by energy ray irradiation and subsequent rapid cooling) substantially parallel to each other are present at predetermined intervals in the rolling direction are formed in the base steel sheet, and the intervals (that is, the intervals of strain regions adjacent to each other) are set to 10 mm or less in the rolling direction.

When the intervals of the plurality of linear strain regions in the rolling direction are more than 10 mm, the iron loss improvement effect is insufficient. Therefore, the strains (residual strains) are formed by irradiating the tension-applied insulation coating with an energy ray in each rolling direction at intervals of 10 mm or less.

The kind of the energy ray is not particularly limited. A laser or an electron beam, which has been ordinarily put into practical use, can be applied.

In a case where laser irradiation is applied, the laser beam may be a continuous wave laser or a pulsed laser, but a continuous wave laser is preferable. In addition, between the laser beam and the electron beam, the laser beam is preferable. This is because, in a step of electron beam irradiation, a vacuum environment is essential and the production cost increases. Therefore, in the present embodiment, the magnetic domain segmentation treatment is performed using a laser beam. The laser beam is, for example, a fiber laser beam.

In addition, as described above, in order to obtain a grain-oriented electrical steel sheet satisfying both a low iron loss and low noise and having excellent coating adhesion, strains are introduced into the base steel sheet.

Specifically, the tension-applied insulation coating is irradiated with the energy ray so that an energy ray power density Ip that is defined by P/S using an energy ray output P in a unit of W and an energy ray irradiation cross-sectional area S in a unit of $mm^2$ satisfies the following expression (5) and an energy ray input energy Up in a unit of J/mm that is defined by P/Vs using the energy ray output P and an energy ray scanning velocity Vs in a unit of mm/sec satisfies the following expression (6).

$$250 \leq Ip \leq 2,000 \quad \text{Expression (5)}$$

$$0.010 < Up \leq 0.050 \quad \text{Expression (6)}$$

When Ip is less than 250, sufficient energy is not input, and the magnetic domain segmentation effect (iron loss improvement effect) cannot be obtained. Therefore, Ip is 250 or more. Ip is preferably 500 or more.

On the other hand, when Ip becomes more than 2000, excess thermal strains are introduced beyond the magnetic domain segmentation effect, whereby the noise characteristics deteriorate. Therefore, Ip is 2000 or less. Ip is preferably 1750 or less and more preferably 1500 or less.

In addition, when Up is less than 0.010, the irradiation effect cannot be sufficiently obtained, and the iron loss does not improve. On the other hand, when Up is more than 0.050, the noise characteristics deteriorate.

Furthermore, in the method for manufacturing a grain-oriented electrical steel sheet according to the present embodiment, upon the irradiation with the energy ray, the beam aspect ratio is controlled so as to satisfy the following expression (7), the beam aspect ratio being defined by (dl/dc) using a diameter dl in a direction perpendicular to a beam scanning direction (scanning direction) and a diameter dc in the beam scanning direction of the energy ray in a unit of μm.

$$0.0010 < dl/dc < 1.0000 \quad (7)$$

When the beam aspect ratio is 0.0010 or less, heat is released in association with the beam irradiation, the input efficiency of the input energy decreases, and a sufficient magnetic domain segmentation effect (iron loss improvement effect) cannot be obtained. Therefore, the beam aspect ratio is more than 0.0010.

On the other hand, when the beam aspect ratio is 1.0000 or more, heat is not released in association with the beam irradiation; however, instead, residual stress is generated, and an effect of lowering noise cannot be obtained. Therefore, the beam aspect ratio is less than 1.0000. The beam aspect ratio is preferably less than 0.0500 and more preferably less than 0.0050.

In addition, the diameter dl of the energy ray in the direction perpendicular to the beam scanning direction in a unit of μm is made to satisfy the following expression (8).

$$10 < dl < 200 \quad (8)$$

In ordinary laser light source, it is difficult to set the beam diameter to 10 μm or less. Therefore, dl is more than 10.

On the other hand, when dl becomes 200 or more, excess thermal strains are introduced beyond the magnetic domain segmentation effect, whereby the noise characteristics deteriorate. Therefore, dl is less than 200. dl is preferably less than 150 and more preferably less than 100.

In the method for manufacturing a grain-oriented electrical steel sheet according to the present embodiment, as described above, irradiation is performed with an energy ray having a relatively strong Ip in a state where the beam aspect ratio is small. Such irradiation is normally not performed. This is because it is considered that a decrease in the beam aspect ratio leads to dispersion of irradiation energy and weakens the effect of increasing Ip.

However, the present inventors found for the first time that the above-described irradiation conditions are preferable as a result of studies based on a new finding that the spatial distribution control of strains is important from the viewpoint of reducing the iron loss and noise at the same time.

EXAMPLES

Slabs having a chemical composition shown in Table 1 are manufactured. A hot rolling step is performed on these slabs. Specifically, the slabs are heated to 1350° C., and then hot rolling is performed on the slabs to manufacture hot-rolled steel sheets having a sheet thickness of 2.3 mm.

A hot-rolled sheet annealing step is performed on the hot-rolled steel sheets after the hot rolling step at an annealing temperature of 900° C. to 1200° C. for a holding time of 10 to 300 seconds.

After that, cold rolling is performed a plurality of times to obtain 0.17 to 0.27 mm cold-rolled steel sheets.

Decarburization annealing is performed on these cold-rolled steel sheets under conditions shown in Table 2A and Table 2B.

After the decarburization annealing, in test Nos. 11, 13, and 15, steel sheets are held at 700° C. to 850° C. for 10 to 60 seconds in a well-known nitriding treatment atmosphere (an atmosphere containing a gas having a nitriding ability such as hydrogen, nitrogen, or ammonia), and the N contents of the cold-rolled steel sheets after decarburization annealing are made to be 40 ppm or more and 1000 ppm or less.

A final annealing step is performed by applying an annealing separating agent containing magnesium oxide (MgO) as a main component to the surfaces of the steel sheets after a nitriding treatment in the test Nos. 11, 13, and 15 and after the decarburization annealing in the other test Nos. The final annealing temperature in the final annealing step is 1200° C., and the holding time at the final annealing temperature is 20 hours.

An insulation coating agent containing colloidal silica and phosphate as main components is applied to the surfaces (on glass coatings) of the steel sheets (grain-oriented electrical steel sheets) after cooling in the final annealing step and then baked to form tension-applied insulation coatings. A grain-oriented electrical steel sheet with each test number is manufactured by the above-described steps.

TABLE 1

| Kind of steel | Slab (mass %, remainder: Fe and impurities) | | | | | | | | | | | | |
|---|---|---|---|---|---|---|---|---|---|---|---|---|---|
| | C | Si | Mn | P | S | sol. Al | N | Cu | Cr | Sn | Se | Sb | Mo |
| A | 0.074 | 3.31 | 0.07 | 0.02 | 0.024 | 0.026 | 0.008 | — | — | — | — | — | — |
| B | 0.060 | 3.25 | 0.15 | 0.01 | 0.021 | 0.021 | 0.015 | — | — | — | — | — | — |
| C | 0.040 | 3.15 | 0.23 | 0.02 | 0.016 | 0.034 | 0.015 | 0.02 | — | — | — | — | — |
| D | 0.050 | 3.26 | 0.25 | 0.02 | 0.009 | 0.035 | 0.015 | — | 0.01 | — | — | — | — |
| E | 0.079 | 3.35 | 0.08 | 0.01 | 0.026 | 0.027 | 0.008 | — | — | 0.10 | — | — | — |
| F | 0.061 | 3.41 | 0.07 | 0.01 | 0.006 | 0.024 | 0.006 | — | — | — | 0.010 | — | — |
| G | 0.069 | 3.29 | 0.09 | 0.01 | 0.008 | 0.022 | 0.007 | — | — | — | — | 0.020 | — |
| H | 0.081 | 3.28 | 0.07 | 0.02 | 0.025 | 0.022 | 0.008 | — | — | — | — | — | 0.01 |

TABLE 2A

| | Material | | Decarburization annealing step | | | | | | | |
|---|---|---|---|---|---|---|---|---|---|---|
| Test No. | Kind of steel | Thickness mm | Temperature-raising process 550° C. to 750° C. temperature rising rate ° C./sec | Temperature-raising process 550° C. to 750° C. oxygen potential | First soaking temperature ° C. | First soaking time Sec | First soaking oxygen potential | Second soaking temperature ° C. | Second soaking time Sec | Second soaking oxygen potential |
| 1 | A | 0.27 | 800 | 0.0050 | 850 | 120 | 0.500 | 900 | 20 | 0.100 |
| 2 | A | 0.17 | 800 | 0.0002 | 850 | 120 | 0.500 | 900 | 20 | 0.100 |
| 3 | A | 0.17 | 800 | 0.0050 | 850 | 200 | 0.500 | 900 | 40 | 0.100 |
| 4 | B | 0.22 | 800 | 0.0002 | 850 | 200 | 0.600 | 900 | 40 | 0.100 |
| 5 | B | 0.22 | 800 | 0.0010 | 850 | 300 | 0.600 | 900 | 60 | 0.100 |
| 6 | B | 0.22 | 800 | 0.0090 | 850 | 300 | 0.600 | 900 | 60 | 0.050 |
| 7 | C | 0.22 | 1000 | 0.0010 | 850 | 400 | 0.700 | 900 | 80 | 0.050 |
| 8 | D | 0.22 | 1000 | 0.0002 | 850 | 400 | 0.700 | 900 | 80 | 0.050 |
| 9 | A | 0.27 | 1000 | 0.0006 | 850 | 480 | 0.700 | 900 | 90 | 0.100 |
| 10 | A | 0.17 | 1200 | 0.0008 | 810 | 140 | 0.430 | 930 | 15 | 0.010 |
| 11 | E | 0.27 | 1200 | 0.0040 | 820 | 120 | 0.420 | 930 | 15 | 0.010 |
| 12 | D | 0.17 | 1200 | 0.0090 | 820 | 120 | 0.500 | 930 | 15 | 0.010 |
| 13 | B | 0.17 | 1200 | 0.0010 | 830 | 120 | 0.500 | 930 | 15 | 0.010 |
| 14 | E | 0.27 | 1000 | 0.0006 | 900 | 200 | 0.500 | 1000 | 20 | 0.100 |
| 15 | A | 0.22 | 1000 | 0.0002 | 820 | 120 | 0.500 | 950 | 10 | 0.005 |
| 16 | A | 0.19 | 1000 | 0.0090 | 820 | 120 | 0.410 | 930 | 10 | 0.005 |
| 17 | E | 0.19 | 1000 | 0.0010 | 820 | 140 | 0.450 | 930 | 20 | 0.005 |
| 18 | D | 0.27 | 1900 | 0.0030 | 900 | 300 | 0.600 | 1000 | 60 | 0.100 |
| 19 | H | 0.19 | 1200 | 0.0003 | 830 | 120 | 0.420 | 950 | 10 | 0.010 |
| 20 | E | 0.27 | 1900 | 0.0010 | 900 | 400 | 0.700 | 1000 | 60 | 0.100 |
| 21 | E | 0.22 | 1200 | 0.0060 | 830 | 120 | 0.410 | 950 | 10 | 0.010 |
| 22 | B | 0.17 | 1900 | 0.0009 | 900 | 480 | 0.700 | 1000 | 80 | 0.100 |
| 23 | A | 0.22 | 1900 | 0.0010 | 900 | 480 | 0.700 | 1000 | 80 | 0.100 |
| 24 | C | 0.22 | 1900 | 0.0009 | 900 | 480 | 0.700 | 1000 | 80 | 0.100 |
| 25 | D | 0.17 | 400 | 0.0010 | 850 | 120 | 0.500 | 900 | 20 | 0.050 |
| 26 | E | 0.17 | 800 | 0.0030 | 950 | 120 | 0.500 | 900 | 40 | 0.050 |

TABLE 2B

| | Material | | Decarburization annealing step | | | | | | | |
|---|---|---|---|---|---|---|---|---|---|---|
| | | | Temperature-raising process 550° C. to 750° C. | Temperature-raising process 550° C. to 750° C. | First soaking | First soaking | First | Second | Second | Second |
| Test No. | Kind of steel | Thickness mm | temperature rising rate ° C./sec | oxygen potential | soaking temperature ° C. | soaking time Sec | soaking oxygen potential | soaking temperature ° C. | soaking time Sec | soaking oxygen potential |
| 27 | C | 0.17 | 1200 | 0.0020 | 800 | 120 | 0.600 | 900 | 60 | 0.050 |
| 28 | A | 0.17 | 1500 | 0.0002 | 850 | 60 | 0.600 | 900 | 80 | 0.050 |
| 29 | B | 0.17 | 1800 | 0.0006 | 850 | 600 | 0.700 | 900 | 90 | 0.050 |
| 30 | C | 0.17 | 1200 | 0.0003 | 850 | 120 | 0.300 | 1000 | 20 | 0.050 |
| 31 | E | 0.17 | 800 | 0.0040 | 850 | 120 | 0.900 | 1000 | 40 | 0.050 |
| 32 | F | 0.17 | 2000 | 0.0030 | 850 | 200 | 0.500 | 1000 | 60 | 0.050 |
| 33 | B | 0.22 | 2500 | 0.0010 | 850 | 200 | 0.500 | 1000 | 80 | 0.050 |
| 34 | G | 0.22 | 900 | 0.0090 | 850 | 200 | 0.500 | 1000 | 90 | 0.050 |
| 35 | G | 0.22 | 1500 | 0.0020 | 850 | 300 | 0.600 | 1000 | 60 | 0.050 |
| 36 | E | 0.22 | 1600 | 0.0006 | 850 | 300 | 0.600 | 800 | 10 | 0.050 |
| 37 | A | 0.22 | 1800 | 0.0030 | 850 | 300 | 0.700 | 800 | 120 | 0.050 |
| 38 | F | 0.22 | 1900 | 0.0002 | 900 | 120 | 0.700 | 800 | 60 | 0.200 |
| 39 | D | 0.22 | 1900 | 0.0003 | 900 | 120 | 0.600 | 800 | 40 | 0.050 |
| 40 | D | 0.27 | 1900 | 0.0002 | 900 | 200 | 0.600 | 900 | 20 | 0.050 |
| 41 | B | 0.27 | 1300 | 0.0009 | 900 | 200 | 0.600 | 900 | 120 | 0.050 |
| 42 | B | 0.27 | 1000 | 0.0003 | 900 | 300 | 0.500 | 900 | 10 | 0.200 |
| 43 | E | 0.27 | 1500 | 0.0030 | 900 | 300 | 0.500 | 900 | 10 | 0.200 |
| 44 | E | 0.27 | 1200 | 0.0030 | 900 | 400 | 0.600 | 1050 | 10 | 0.050 |
| 45 | C | 0.27 | 1200 | 0.0090 | 900 | 400 | 0.600 | 1050 | 80 | 0.200 |
| 46 | A | 0.27 | 1000 | 0.0080 | 900 | 480 | 0.700 | 1050 | 10 | 0.050 |
| 47 | C | 0.27 | 1800 | 0.0010 | 900 | 480 | 0.700 | 1050 | 80 | 0.200 |
| 48 | D | 0.27 | 1800 | 0.0200 | 900 | 480 | 0.700 | 1000 | 80 | 0.050 |
| 49 | F | 0.27 | 1800 | 0.0001 | 900 | 480 | 0.700 | 1000 | 80 | 0.050 |
| 50 | A | 0.22 | 1000 | 0.0090 | 820 | 120 | 0.410 | 930 | 10 | 0.005 |
| 51 | A | 0.22 | 1000 | 0.0090 | 820 | 120 | 0.410 | 930 | 10 | 0.005 |
| 52 | C | 0.22 | 1000 | 0.0090 | 820 | 120 | 0.410 | 930 | 10 | 0.005 |

[Analysis of Chemical Composition of Base Steel Sheet]

The chemical composition of the base steel sheet of the grain-oriented electrical steel sheet with each test number before magnetic domain segmentation obtained by the above-described method is obtained by the following method. First, the tension-applied insulation coating is removed from the grain-oriented electrical steel sheet with each test number. Specifically, the grain-oriented electrical steel sheet is immersed in a sodium hydroxide aqueous solution (80° C. to 90° C.) containing NaOH: 30 to 50 mass % and $H_2O$: 50 to 70 mass % for 7 to 10 minutes. The grain-oriented electrical steel sheet after the immersion (the grain-oriented electrical steel sheet from which the tension-applied insulation coating has been removed) is washed with water. After the water washing, the grain-oriented electrical steel sheet is dried with a warm air blower for a little less than 1 minute.

Next, the glass coating is removed from the grain-oriented electrical steel sheet including no tension-applied insulation coating. Specifically, the grain-oriented electrical steel sheet is immersed in a hydrochloric acid aqueous solution (80° C. to 90° C.) containing 30 to 40 mass % of HCL for 1 to 10 minutes. Thereby, the glass coating is removed from the base steel sheet. The base steel sheet after the immersion is washed with water. After the water washing, the grain-oriented electrical steel sheet is dried with a warm air blower for a little less than 1 minute. The base steel sheet is taken out from the grain-oriented electrical steel sheet by the above-described step.

The chemical composition of the taken-out base steel sheet is obtained by a well-known component analysis method. Specifically, chips are generated from the base steel sheet using a drill, and the chips are collected. The collected chips are dissolved in an acid to obtain a solution. ICP-AES is performed on the solution to perform an elemental analysis of the chemical composition. Si in the chemical composition of the base steel sheet is obtained by a method specified in JIS G 1212: 1997 (Methods for Determination of Silicon Content). Specifically, when the above-described chips are dissolved in an acid, silicon oxide is precipitated as a precipitate. This precipitate (silicon oxide) is filtered out with filter paper, and the mass is measured, thereby obtaining the Si content. The C content and the S content are obtained by a well-known high-frequency combustion method (combustion-infrared absorption method). Specifically, the above-described solution is combusted by high-frequency heating in an oxygen stream, carbon dioxide and sulfur dioxide generated are detected, and the C content and the S content are obtained. The N content is obtained using a well-known inert gas melting-thermal conductivity method. The chemical composition of the base steel sheet is obtained by the above-described analysis method. The chemical composition of the steel sheet (base steel sheet) with each test number is as shown in Table 3. "-" in Table 3 indicates that the corresponding element content is less than the detection limit.

[Evaluation of Magnetic Characteristics]

While not shown in the table, a sample having a width of 60 mm and a length of 300 mm including the sheet width center position is collected from the grain-oriented electrical steel sheet with each test number. The length of the sample is set to be parallel to the rolling direction. The collected sample is held at 800° C. for 2 hours in a nitrogen atmosphere having a dew point of 0° C. or lower, and strains introduced at the time of sample collection are removed.

The magnetic flux density (T) is obtained by a single sheet magnetic characteristics test (SST test) in accordance with JIS C2556 (2015) using this sample. Specifically, a magnetic field of 800 A/m is applied to the sample, and the magnetic flux density (T) is obtained.

Furthermore, the iron loss $W_{17/50}$ (W/kg) at a frequency set to 50 Hz and a maximum magnetic flux density set to 1.7 Tis measured in accordance with JIS C2556 (2015) using the sample.

TABLE 3

| Kind of steel | Steel sheet (mass %, remainder: Fe and impurities) | | | | | | | | | | | | |
|---|---|---|---|---|---|---|---|---|---|---|---|---|---|
| | C | Si | Mn | P | S | sol. Al | N | Cu | Cr | Sr | Se | Sb | Mo |
| A | 0.001 | 3.20 | 0.07 | 0.02 | <0.002 | <0.004 | <0.002 | — | — | — | — | — | — |
| B | 0.001 | 3.15 | 0.15 | 0.01 | <0.002 | <0.004 | <0.002 | — | — | — | — | — | — |
| C | 0.001 | 3.05 | 0.23 | 0.02 | <0.002 | <0.004 | <0.002 | 0.02 | — | — | — | — | — |
| D | 0.001 | 3.15 | 0.25 | 0.02 | <0.002 | <0.004 | <0.002 | — | 0.01 | — | — | — | — |
| E | 0.001 | 3.24 | 0.08 | 0.01 | <0.002 | <0.004 | <0.002 | — | — | 0.10 | — | — | — |
| F | 0.001 | 3.30 | 0.07 | 0.01 | <0.002 | <0.004 | <0.002 | — | — | — | 0.005 | — | — |
| G | 0.001 | 3.18 | 0.09 | 0.01 | <0.002 | <0.004 | <0.002 | — | — | — | — | 0.020 | — |
| H | 0.001 | 3.17 | 0.07 | 0.02 | <0.002 | <0.004 | <0.002 | — | — | — | — | — | 0.01 |

In addition, on the obtained grain-oriented electrical steel sheet with each test number (after the tension-applied insulation coating was formed), magnetic domain segmentation is performed by irradiating the surface of the steel sheet with an energy ray using a laser (fiber laser or pulsed laser) or an electron beam under conditions shown in Table 4A and Table 4B, and evaluation tests of the noise characteristics and the magnetic characteristics are performed. In addition, the overall thickness of the glass coating is measured by the above-described method, and then the area ratios S1, S2, and S3 of the $MgAl_2O_4$ phase in each region are also measured.

TABLE 4A

| | Magnetic domain segmentation step | | | | | | | |
|---|---|---|---|---|---|---|---|---|
| Test No. | Laser/ electron beam | Continuous/ intermittent | Ip W/mm² | Up J/mm | dl/dc | dl μm | Deviation angle with respect to direction perpendicular to rolling direction ° | Intervals in rolling direction mm | Width of linear strain μm |
| 1 | Laser | Continuous | 320 | 0.004 | 0.0032 | 40 | 10 | 5 | 50 |
| 2 | Laser | Intermittent | 438 | 0.012 | 0.0101 | 90 | 20 | 8 | 100 |
| 3 | Laser | Continuous | 400 | 0.011 | 0.0061 | 70 | 5 | 4 | 80 |
| 4 | Laser | Continuous | 333 | 0.017 | 0.0043 | 80 | 5 | 4 | 90 |
| 5 | Laser | Continuous | 37 | 0.005 | 0.0015 | 150 | 10 | 5 | 160 |
| 6 | Laser | Intermittent | 433 | 0.026 | 0.0171 | 160 | 8 | 3 | 170 |
| 7 | Laser | Continuous | 450 | 0.045 | 0.0162 | 180 | 15 | 7 | 190 |
| 8 | Laser | Continuous | 1300 | 0.033 | 0.0484 | 220 | 25 | 8 | 230 |
| 9 | Laser | Intermittent | 84 | 0.080 | 0.0027 | 225 | 10 | 9 | 235 |
| 10 | Laser | Continuous | 550 | 0.037 | 0.0030 | 95 | 5 | 4 | 105 |
| 11 | Laser | Continuous | 283 | 0.043 | 0.0022 | 115 | 15 | 9 | 125 |
| 12 | Laser | Continuous | 238 | 0.038 | 0.0025 | 140 | 28 | 8 | 150 |
| 13 | Laser | Intermittent | 1800 | 0.045 | 0.0121 | 110 | 10 | 7 | 120 |
| 14 | Laser | Continuous | 90 | 0.036 | 0.0028 | 235 | 20 | 6 | 245 |
| 15 | Laser | Continuous | 253 | 0.038 | 0.0039 | 170 | 5 | 7 | 180 |
| 16 | Laser | Intermittent | 1100 | 0.044 | 0.0085 | 130 | 0 | 6 | 140 |
| 17 | Laser | Intermittent | 1533 | 0.042 | 0.0160 | 155 | 10 | 5 | 165 |
| 18 | Laser | Intermittent | 250 | 0.056 | 0.0016 | 125 | 20 | 6 | 135 |
| 19 | Laser | Continuous | 50 | 0.048 | 0.0009 | 210 | 8 | 5 | 220 |
| 20 | Laser | Continuous | 2083 | 0.056 | 0.0241 | 170 | 5 | 5 | 180 |
| 21 | Laser | Continuous | 2000 | 0.050 | 0.0241 | 190 | 0 | 6 | 200 |
| 22 | Laser | Continuous | 2000 | 0.050 | 0.0241 | 190 | 3 | 12 | 200 |
| 23 | Laser | Continuous | 3800 | 0.011 | 0.0064 | 40 | 5 | 4 | 50 |
| 24 | Laser | Continuous | 2273 | 0.004 | 0.0073 | 40 | 3 | 3 | 50 |
| 25 | Laser | Continuous | 500 | 0.044 | 0.0020 | 90 | 5 | 4 | 100 |
| 26 | Laser | Continuous | 500 | 0.044 | 0.0020 | 90 | 5 | 4 | 100 |

TABLE 4B

| | | | | | | | | |
|---|---|---|---|---|---|---|---|---|
| | | | | | | | Magnetic domain segmentation step | |
| Test No. | Laser/ electron beam | Continuous/ intermittent | Ip W/mm² | Up J/mm | dI/dc | dl μm | Deviation angle with respect to direction perpendicular to rolling direction ° | Intervals in rolling direction mm | Width of linear strain μm |
| 27 | Laser | Continuous | 500 | 0.044 | 0.0020 | 90 | 5 | 4 | 100 |
| 28 | Laser | Continuous | 500 | 0.044 | 0.0020 | 90 | 5 | 4 | 100 |
| 29 | Laser | Continuous | 500 | 0.044 | 0.0020 | 90 | 5 | 4 | 100 |
| 30 | Laser | Continuous | 500 | 0.044 | 0.0020 | 90 | 5 | 4 | 100 |
| 31 | Laser | Continuous | 500 | 0.044 | 0.0020 | 90 | 5 | 4 | 100 |
| 32 | Laser | Continuous | 500 | 0.044 | 0.0020 | 90 | 5 | 4 | 100 |
| 33 | Laser | Continuous | 500 | 0.044 | 0.0020 | 90 | 5 | 4 | 100 |
| 34 | Laser | Continuous | 500 | 0.044 | 0.0020 | 90 | 5 | 4 | 100 |
| 35 | Laser | Continuous | 500 | 0.044 | 0.0020 | 90 | 5 | 4 | 100 |
| 36 | Laser | Continuous | 500 | 0.044 | 0.0020 | 90 | 5 | 4 | 100 |
| 37 | Laser | Continuous | 500 | 0.044 | 0.0020 | 90 | 5 | 4 | 100 |
| 38 | Laser | Continuous | 500 | 0.044 | 0.0020 | 90 | 5 | 4 | 100 |
| 39 | Laser | Continuous | 500 | 0.044 | 0.0020 | 90 | 5 | 4 | 100 |
| 40 | Laser | Continuous | 500 | 0.044 | 0.0020 | 90 | 5 | 4 | 100 |
| 41 | Laser | Continuous | 500 | 0.044 | 0.0020 | 90 | 5 | 4 | 100 |
| 42 | Laser | Continuous | 500 | 0.044 | 0.0020 | 90 | 5 | 4 | 100 |
| 43 | Laser | Continuous | 500 | 0.044 | 0.0020 | 90 | 5 | 4 | 100 |
| 44 | Laser | Continuous | 500 | 0.044 | 0.0020 | 90 | 5 | 4 | 100 |
| 45 | Laser | Continuous | 500 | 0.044 | 0.0020 | 90 | 5 | 4 | 100 |
| 46 | Laser | Continuous | 500 | 0.044 | 0.0020 | 90 | 5 | 4 | 100 |
| 47 | Laser | Continuous | 500 | 0.044 | 0.0020 | 90 | 5 | 4 | 100 |
| 48 | Laser | Continuous | 500 | 0.044 | 0.0020 | 90 | 5 | 4 | 100 |
| 49 | Laser | Continuous | 500 | 0.044 | 0.0020 | 90 | 5 | 4 | 100 |
| 50 | Laser | Continuous | 1000 | 0.040 | <u>0.0009</u> | 100 | 5 | 6 | 110 |
| 51 | Laser | Continuous | 1000 | 0.040 | <u>1.0000</u> | 100 | 5 | 6 | 110 |
| 52 | Laser | Continuous | 1000 | 0.040 | <u>5.0000</u> | 100 | 5 | 6 | 110 |

[Evaluation of Noise Characteristics and Magnetostriction]

A sample having width of 100 mm and a length of 500 mm is collected from each grain-oriented electrical steel sheet. The length direction of the sample is made to correspond to the rolling direction RD, and the width direction is made to correspond to the sheet width direction TD.

From the sample, magnetostriction is measured by an AC magnetostriction measuring method using a magnetostriction measuring instrument. As the magnetostriction measuring instrument, an apparatus including a laser Doppler vibrometer, an exciting coil, an exciting power supply, a magnetic flux detecting coil, an amplifier, and an oscilloscope is used.

Specifically, an AC magnetic field is applied to the sample so that the maximum magnetic flux density in the rolling direction is 1.7 T and the frequency is 50 Hz. A change in the length of the sample caused by the expansion and contraction of the magnetic domains is measured with the laser Doppler vibrometer, and a magnetostriction signal is obtained. Fourier analysis is performed on the obtained magnetostriction signal to obtain an amplitude Cn of each frequency component fn (n is a natural number of 1 or more) of the magnetostriction signal. A magnetostriction rate level LVA (dB) represented by the following expression is obtained using an A correction coefficient an of each frequency component fn.

$$LVA = 20 \times \mathrm{Log}(\sqrt{(\Sigma(\rho c \times 2\pi \times fn \times an \times Cn/\sqrt{2})^2)}/Pe0)$$

Here, $\rho c$ is an intrinsic acoustic resistance, and $\rho c$ is set to 400. Pe0 is the minimum audible sound pressure, and $Pe0 = 2 \times 10^{-5}$ (Pa) is used. As the A correction coefficient an, values shown in Table 2 of JIS C 1509-1 (2005) are used.

Based on the obtained magnetostriction rate level (LVA), the noise characteristics are evaluated according to the following criteria. When the magnetostriction rate level is less than 60 dBA, the grain-oriented electrical steel sheet is determined as excellent in terms of noise characteristics.

Furthermore, magnetostriction $\lambda_{0-p}$ (μm/m) is obtained from the magnetostriction signal. Specifically, from the length Lp (μm) of the test piece (steel sheet) at a magnetic flux density of 1.7 T and the length $L_0$ (m) of the test piece at a magnetic flux density of 0 T under the above excitation conditions, $\lambda_{0-p}$ is calculated from $(Lp-L_0)/L_0$.

Furthermore, regarding the steel sheet on which the heat treatment has been performed at 800° C. for 4 hours, the magnetostriction $\lambda_{0-p}$ (μm/m) is measured in the same manner when the frequency is set to 50 Hz and the maximum magnetic flux density is set to 1.7 T. In addition, $\lambda_{0-pb}-\lambda_{0-pa}$ is obtained where $\lambda_{0-pb}$ indicates magnetostriction before the heat treatment and $\lambda_{0-pa}$ indicates magnetostriction after the heat treatment.

The results are shown in Table 5A, Table 5B, Table 6A, and Table 6B.

[Evaluation of Magnetic Characteristics]

A sample having a width of 60 mm and a length of 300 mm including the sheet width center position is collected from the grain-oriented electrical steel sheet with each test number. The length of the sample is set to be parallel to the rolling direction. The collected sample is held at 800° C. for 2 hours in a nitrogen atmosphere having a dew point of 0° C. or lower, and strains introduced at the time of sample collection are removed.

The magnetic flux density (T) is obtained by a single sheet magnetic characteristics test (SST test) in accordance with JIS C2556 (2015) using this sample. Specifically, a magnetic field of 800 A/m is applied to the sample, and the magnetic flux density (T) is obtained.

Furthermore, the iron loss $W_{17/50}$ (W/kg) at a frequency set to 50 Hz and a maximum magnetic flux density set to 1.7 T is measured in accordance with JIS C2556 (2015) using the sample. In a case where the iron loss improvement ratio of 5.0% or more is satisfied, the iron loss improvement ratio is determined as excellent. The measurement results are shown in Table 6A and Table 6B.

[Coating Adhesion]

The coating adhesion (coating residual area ratio) of the grain-oriented electrical steel sheet is measured by the above-described method. When the coating residual area ratio is 50% or more, the coating adhesion is determined as acceptable (evaluation ◯), and, when the coating adhesion is 90% or more, the coating adhesion is determined as excellent (evaluation ◉). The evaluation results are shown in Table 6A and Table 6B:

TABLE 5A

| Test No. | Magnetostriction | | | Overall thickness of glass coating μm | Area ratio of $Mg_2AlO_4$ phase | | | | |
|---|---|---|---|---|---|---|---|---|---|
| | $\lambda_{0\text{-}pa}$ | $\lambda_{0\text{-}pb}$ | $\lambda_{0\text{-}pb} - \lambda_{0\text{-}pa}$ | | S1 | S2 | S3 | (S1 + S2 + S3)/3 | S1 > S2 > S3 |
| 1 | −0.82 | −0.81 | 0.01 | 2.2 | 0.60 | 0.12 | 0.01 | 0.24 | ◯ |
| 2 | −0.87 | −0.84 | 0.03 | 2.0 | 0.50 | 0.15 | 0.02 | 0.22 | ◯ |
| 3 | −0.89 | −0.78 | 0.11 | 3.4 | 0.65 | 0.16 | 0.00 | 0.27 | ◯ |
| 4 | −0.81 | −0.74 | 0.07 | 2.2 | 0.64 | 0.15 | 0.02 | 0.27 | ◯ |
| 5 | −0.89 | −0.88 | 0.01 | 3.0 | 0.67 | 0.20 | 0.02 | 0.30 | ◯ |
| 6 | −0.92 | −0.74 | 0.18 | 2.7 | 0.70 | 0.14 | 0.08 | 0.31 | ◯ |
| 7 | −0.87 | −0.78 | 0.09 | 2.6 | 0.62 | 0.16 | 0.05 | 0.28 | ◯ |
| 8 | −0.96 | −0.84 | 0.12 | 2.2 | 0.59 | 0.18 | 0.06 | 0.28 | ◯ |
| 9 | −0.91 | −0.90 | 0.01 | 3.5 | 0.57 | 0.19 | 0.07 | 0.28 | ◯ |
| 10 | −0.85 | −0.66 | 0.19 | 2.0 | 0.64 | 0.20 | 0.05 | 0.30 | ◯ |
| 11 | −0.86 | −0.84 | 0.02 | 2.1 | 0.48 | 0.25 | 0.04 | 0.26 | ◯ |
| 12 | −0.92 | −0.91 | 0.01 | 2.1 | 0.67 | 0.23 | 0.01 | 0.30 | ◯ |
| 13 | −0.91 | −0.73 | 0.18 | 2.7 | 0.64 | 0.19 | 0.06 | 0.30 | ◯ |
| 14 | −0.84 | −0.83 | 0.01 | 1.9 | 0.58 | 0.14 | 0.08 | 0.27 | ◯ |
| 15 | −0.89 | −0.81 | 0.08 | 2.9 | 0.67 | 0.18 | 0.09 | 0.31 | ◯ |
| 16 | −0.91 | −0.77 | 0.14 | 3.4 | 0.66 | 0.24 | 0.08 | 0.33 | ◯ |
| 17 | −0.84 | −0.69 | 0.15 | 2.9 | 0.54 | 0.15 | 0.04 | 0.24 | ◯ |
| 18 | −0.81 | −0.51 | 0.30 | 2.3 | 0.57 | 0.27 | 0.03 | 0.29 | ◯ |
| 19 | −0.94 | −0.78 | 0.16 | 2.4 | 0.54 | 0.22 | 0.01 | 0.26 | ◯ |
| 20 | −0.85 | −0.40 | 0.45 | 1.9 | 0.56 | 0.16 | 0.08 | 0.27 | ◯ |
| 21 | −0.91 | −0.71 | 0.20 | 3.1 | 0.59 | 0.18 | 0.00 | 0.26 | ◯ |
| 22 | −0.88 | −0.87 | 0.01 | 3.4 | 0.64 | 0.11 | 0.06 | 0.27 | ◯ |
| 23 | −0.89 | −0.51 | 0.38 | 3.2 | 0.67 | 0.19 | 0.07 | 0.31 | ◯ |
| 24 | −0.84 | −0.83 | 0.01 | 1.6 | 0.69 | 0.20 | 0.05 | 0.31 | ◯ |
| 25 | −0.95 | −0.76 | 0.19 | 2.5 | 0.41 | 0.43 | 0.19 | 0.34 | x |
| 26 | −0.84 | −0.67 | 0.17 | 1.8 | 0.43 | 0.45 | 0.12 | 0.33 | x |

TABLE 5B

| Test. No. | Magnetostriction | | | Overall thickness of glass coating μm | Area ratio of $Mg_2AlO_4$ phase | | | | |
|---|---|---|---|---|---|---|---|---|---|
| | $\lambda_{0\text{-}pa}$ | $\lambda_{0\text{-}pb}$ | $\lambda_{0\text{-}pb} - \lambda_{0\text{-}pa}$ | | S1 | S2 | S3 | (S1 + S2 + S3)/3 | S1 > S2 > S3 |
| 27 | −0.9 | −0.74 | 0.16 | 2.2 | 0.43 | 0.46 | 0.09 | 0.33 | x |
| 28 | −0.87 | −0.69 | 0.18 | 3.1 | 0.60 | 0.26 | 0.13 | 0.33 | ◯ |
| 29 | −0.89 | −0.73 | 0.16 | 3.1 | 0.65 | 0.32 | 0.17 | 0.38 | ◯ |
| 30 | −0.92 | −0.75 | 0.17 | 2.3 | 0.68 | 0.40 | 0.13 | 0.40 | ◯ |
| 31 | −0.86 | −0.71 | 0.15 | 1.6 | 0.53 | 0.26 | 0.15 | 0.31 | ◯ |
| 32 | −0.97 | −0.79 | 0.18 | 2.8 | 0.48 | 0.46 | 0.06 | 0.33 | ◯ |
| 33 | −0.91 | −0.76 | 0.15 | 2.5 | 0.61 | 0.41 | 0.19 | 0.40 | ◯ |
| 34 | −0.89 | −0.75 | 0.14 | 2.6 | 0.53 | 0.19 | 0.09 | 0.27 | ◯ |
| 35 | −0.88 | −0.74 | 0.14 | 3.1 | 0.54 | 0.29 | 0.06 | 0.30 | ◯ |
| 36 | −0.94 | −0.78 | 0.16 | 3.3 | 0.51 | 0.28 | 0.15 | 0.31 | ◯ |
| 37 | −0.81 | −0.65 | 0.16 | 2.6 | 0.63 | 0.22 | 0.16 | 0.34 | ◯ |
| 38 | −0.86 | −0.69 | 0.17 | 1.9 | 0.64 | 0.27 | 0.14 | 0.35 | ◯ |
| 39 | −0.94 | −0.80 | 0.14 | 2.4 | 0.68 | 0.19 | 0.14 | 0.34 | ◯ |
| 40 | −0.86 | −0.71 | 0.15 | 1.7 | 0.67 | 0.42 | 0.07 | 0.39 | ◯ |
| 41 | −0.87 | −0.73 | 0.14 | 2.7 | 0.70 | 0.60 | 0.40 | 0.57 | ◯ |
| 42 | −0.94 | −0.78 | 0.16 | 1.8 | 0.67 | 0.43 | 0.18 | 0.43 | ◯ |
| 43 | −0.93 | −0.78 | 0.15 | 2.1 | 0.69 | 0.43 | 0.14 | 0.42 | ◯ |
| 44 | −0.92 | −0.75 | 0.17 | 3.0 | 0.65 | 0.31 | 0.17 | 0.38 | ◯ |
| 45 | −0.9 | −0.74 | 0.16 | 2.5 | 0.67 | 0.34 | 0.19 | 0.40 | ◯ |
| 46 | −0.84 | −0.70 | 0.14 | 2.1 | 0.71 | 0.27 | 0.15 | 0.38 | ◯ |
| 47 | −0.86 | −0.71 | 0.15 | 2.4 | 0.68 | 0.26 | 0.18 | 0.37 | ◯ |
| 48 | −0.82 | −0.69 | 0.13 | 3.1 | 0.65 | 0.24 | 0.15 | 0.35 | ◯ |
| 49 | −0.88 | −0.69 | 0.19 | 1.6 | 0.72 | 0.23 | 0.11 | 0.35 | ◯ |
| 50 | −0.91 | −0.89 | 0.02 | 3.2 | 0.67 | 0.26 | 0.07 | 0.33 | ◯ |

TABLE 5B-continued

| | Magnetostriction | | | Overall thickness of glass coating μm | Area ratio of $Mg_2AlO_4$ phase | | | | |
|---|---|---|---|---|---|---|---|---|---|
| Test. No. | $\lambda_{0\text{-}pa}$ | $\lambda_{0\text{-}pb}$ | $\lambda_{0\text{-}pb} - \lambda_{0\text{-}pa}$ | | S1 | S2 | S3 | (S1 + S2 + S3)/3 | S1 > S2 > S3 |
| 51 | −0.92 | −0.70 | 0.22 | 2.6 | 0.68 | 0.23 | 0.08 | 0.33 | ○ |
| 52 | −0.91 | −0.62 | 0.29 | 2.8 | 0.70 | 0.30 | 0.06 | 0.35 | ○ |

TABLE 6A

| | Magnetic characteristics | | | | | | | |
|---|---|---|---|---|---|---|---|---|
| Test No. | Iron loss W/kg | Magnetic flux density T | Iron loss improvement ratio % | Iron loss improvement ratio 5% or more ○ | Noise characteristics dB | Coating residual area ratio % | Iron loss/noise balance | Coating evaluation |
| 1 | 0.80 | 1.91 | 4.8 | X | 49 | 100 | X | ◉ |
| 2 | 0.72 | 1.91 | 7.9 | ○ | 47 | 99 | ○ | ◉ |
| 3 | 0.71 | 1.91 | 8.6 | ○ | 50 | 98 | ○ | ◉ |
| 4 | 0.74 | 1.91 | 8.1 | ○ | 52 | 98 | ○ | ◉ |
| 5 | 0.81 | 1.91 | 0.0 | X | 47 | 100 | X | ◉ |
| 6 | 0.73 | 1.91 | 10.5 | ○ | 57 | 94 | ○ | ◉ |
| 7 | 0.74 | 1.90 | 8.6 | ○ | 53 | 96 | ○ | ◉ |
| 8 | 0.74 | 1.91 | 9.1 | ○ | 60 | 95 | X | ◉ |
| 9 | 0.80 | 1.92 | 4.8 | X | 49 | 98 | X | ◉ |
| 10 | 0.69 | 1.90 | 11.6 | ○ | 57 | 91 | ○ | ◉ |
| 11 | 0.79 | 1.91 | 6.0 | ○ | 49 | 96 | ○ | ◉ |
| 12 | 0.81 | 1.91 | 3.8 | ○ | 50 | 95 | X | ◉ |
| 13 | 0.69 | 1.90 | 11.9 | ○ | 58 | 93 | ○ | ◉ |
| 14 | 0.82 | 1.92 | 2.4 | X | 49 | 100 | X | ◉ |
| 15 | 0.76 | 1.91 | 6.2 | ○ | 49 | 97 | ○ | ◉ |
| 16 | 0.73 | 1.90 | 9.8 | ○ | 57 | 96 | ○ | ◉ |
| 17 | 0.72 | 1.90 | 10.9 | ○ | 59 | 95 | ○ | ◉ |
| 18 | 0.77 | 1.90 | 8.1 | ○ | 60 | 96 | X | ◉ |
| 19 | 0.78 | 1.91 | 0.0 | ○ | 51 | 95 | X | ◉ |
| 20 | 0.74 | 1.89 | 11.4 | ○ | 63 | 92 | X | ◉ |
| 21 | 0.68 | 1.90 | 12.8 | ○ | 59 | 91 | ○ | ◉ |
| 22 | 0.76 | 1.91 | 2.6 | X | 55 | 100 | X | ◉ |
| 23 | 0.71 | 1.90 | 12.3 | ○ | 63 | 91 | X | ◉ |
| 24 | 0.78 | 1.90 | 3.7 | X | 57 | 99 | X | ◉ |
| 25 | 0.69 | 1.91 | 12.0 | ○ | 57 | 50 | ○ | ○ |
| 26 | 0.69 | 1.91 | 11.6 | ○ | 58 | 60 | ○ | ○ |

TABLE 6B

| | Magnetic characteristics | | | | | | | |
|---|---|---|---|---|---|---|---|---|
| Test No. | Iron loss W/kg | Magnetic flux density T | Iron loss improvement ratio % | Iron loss improvement ratio 5% or more ○ | Noise characteristics dB | Coating residual area ratio % | Iron loss/noise balance | Coating evaluation |
| 27 | 0.69 | 1.91 | 11.2 | ○ | 58 | 65 | ○ | ○ |
| 28 | 0.69 | 1.91 | 10.9 | ○ | 57 | 70 | ○ | ○ |
| 29 | 0.69 | 1.91 | 11.8 | ○ | 57 | 60 | ○ | ○ |
| 30 | 0.69 | 1.91 | 11.3 | ○ | 57 | 65 | ○ | ○ |
| 31 | 0.69 | 1.91 | 11.6 | ○ | 58 | 60 | ○ | ○ |
| 32 | 0.70 | 1.91 | 10.7 | ○ | 57 | 95 | ○ | ◉ |
| 33 | 0.73 | 1.91 | 10.3 | ○ | 58 | 60 | ○ | ○ |
| 34 | 0.72 | 1.91 | 10.6 | ○ | 58 | 96 | ○ | ◉ |
| 35 | 0.73 | 1.91 | 10.3 | ○ | 58 | 95 | ○ | ◉ |
| 36 | 0.72 | 1.91 | 10.7 | ○ | 58 | 65 | ○ | ○ |
| 37 | 0.72 | 1.91 | 10.6 | ○ | 57 | 60 | ○ | ○ |
| 38 | 0.73 | 1.91 | 10.1 | ○ | 58 | 70 | ○ | ○ |
| 39 | 0.73 | 1.91 | 10.4 | ○ | 58 | 65 | ○ | ○ |
| 40 | 0.76 | 1.91 | 9.6 | ○ | 58 | 96 | ○ | ◉ |
| 41 | 0.76 | 1.91 | 9.5 | ○ | 57 | 80 | ○ | ○ |
| 42 | 0.76 | 1.91 | 9.1 | ○ | 58 | 75 | ○ | ○ |
| 43 | 0.76 | 1.91 | 9.2 | ○ | 58 | 80 | ○ | ○ |

TABLE 6B-continued

| Test No. | Iron loss W/kg | Magnetic flux density T | Iron loss improvement ratio % | Iron loss improvement ratio 5% or more ○ | Noise characteristics dB | Coating residual area ratio % | Iron loss/noise balance | Coating evaluation |
|---|---|---|---|---|---|---|---|---|
| 44 | 0.76 | 1.91 | 9.2 | ○ | 58 | 70 | ○ | ○ |
| 45 | 0.76 | 1.91 | 10.0 | ○ | 58 | 65 | ○ | ○ |
| 46 | 0.76 | 1.91 | 9.8 | ○ | 58 | 70 | ○ | ○ |
| 47 | 0.76 | 1.91 | 9.0 | ○ | 57 | 75 | ○ | ○ |
| 48 | 0.76 | 1.91 | 9.2 | ○ | 56 | 70 | ○ | ○ |
| 49 | 0.76 | 1.91 | 9.4 | ○ | 58 | 75 | ○ | ○ |
| 50 | 0.78 | 1.90 | 3.7 | ○ | 57 | 96 | X | ◎ |
| 51 | 0.76 | 1.90 | 6.2 | ○ | 60 | 97 | X | ◎ |
| 52 | 0.75 | 1.90 | 7.4 | ○ | 61 | 96 | X | ◎ |

As is clear from Table 1 to Table 6B, in the steel sheets (invention examples) in which strain regions are preferably present and $\lambda_{0\text{-}pb} - \lambda_{0\text{-}pa}$ is within the scope of the present invention, it is possible to ensure a favorable iron loss/noise balance. Furthermore, in the steel sheets in which $\lambda_{0\text{-}pb} - \lambda_{0\text{-}pa}$ is within the scope of the present invention and it is possible to ensure a favorable iron loss/noise balance, in a case where the area ratio of the $MgAl_2O_4$ phase in the glass coating in each region satisfies the preferable relationship, the coating residual area ratio is sufficiently high, and favorable adhesion can also be satisfied.

On the other hand, in the steel sheets in which $\lambda_{0\text{-}pb} - \lambda_{0\text{-}pa}$ is outside the scope of the present invention and it is not possible to ensure a favorable iron loss/noise balance, the influence of the area ratio of the $MgAl_2O_4$ phase in the glass coating on the coating residual area ratio is not clear.

INDUSTRIAL APPLICABILITY

According to the present invention, it is possible to provide a grain-oriented electrical steel sheet having a favorable iron loss/noise balance and a method for manufacturing the same. In addition, according to a preferable aspect of the present invention, it is possible to provide a grain-oriented electrical steel sheet having a favorable iron loss/noise balance and also being excellent in terms of coating adhesion. Therefore, the industrial applicability is high.

What is claimed is:

1. A grain-oriented electrical steel sheet comprising:
   a base steel sheet;
   a glass coating formed on the base steel sheet; and
   a tension-applied insulation coating formed on the glass coating,
   wherein, in the base steel sheet, a plurality of linear strain regions that extend continuously or intermittently in a direction intersecting with a rolling direction are present,
   the plurality of linear strain regions are each 210 μm or less in width in the rolling direction,
   the plurality of linear strain regions are parallel to each other, intervals of linear strain regions adjacent to each other in the rolling direction are 10 mm or less, and
   magnetostriction $\lambda_{0\text{-}pb}$ in a unit of μm/m when the grain-oriented electrical steel sheet is excited up to 1.7 T and magnetostriction $\lambda_{0\text{-}pa}$ in a unit of μm/m when the grain-oriented electrical steel sheet is heat-treated at 800° C. for 4 hours and then excited up to 1.7 T satisfy the following expression (1), $$0.02 \leq \lambda_{0\text{-}pb} - \lambda_{0\text{-}pa} \leq 0.20 \quad (1).$$

2. The grain-oriented electrical steel sheet according to claim 1,
   wherein the glass coating is formed of a structure including a $Mg_2SiO_4$ phase that is a primary phase and a $MgAl_2O_4$ phase, and
   in a cross section in a sheet thickness direction, when the glass coating is divided into three regions having an equal thickness in the sheet thickness direction, each region is designated as a 1/3 region, a 2/3 region, and a 3/3 region from a base steel sheet side toward a tension-applied insulation coating side, an area ratio of the $MgAl_2O_4$ phase in the 1/3 region is denoted by S1, an area ratio of the $MgAl_2O_4$ phase in the 2/3 region is denoted by S2, and an area ratio of the $MgAl_2O_4$ phase in the 3/3 region is denoted by S3,
   the S1, the S2, and the S3 satisfy the following expressions (2) to (4), $$S1 > S2 > S3 \quad (2)$$

$$(S1 + S2 + S3)/3 < 0.50 \quad (3)$$

$$S3 < 0.10 \quad (4).$$

3. A method for manufacturing the grain-oriented electrical steel sheet according to claim 1, the method comprising:
   a hot rolling step of heating a steel piece to obtain a hot-rolled steel sheet by hot rolling;
   a hot-rolled sheet annealing step of performing hot-rolled sheet annealing on the hot-rolled steel sheet;
   a pickling step of pickling the hot-rolled steel sheet after the hot-rolled sheet annealing step;
   a cold rolling step of performing cold rolling once or a plurality of times with annealing therebetween on the hot-rolled steel sheet after the pickling step to obtain a cold-rolled steel sheet;
   a decarburization annealing step of performing decarburization annealing on the cold-rolled steel sheet;
   a final annealing step of applying and drying an annealing separating agent containing a MgO powder as a main component onto front and rear surfaces of the cold-rolled steel sheet after the decarburization annealing step, which is the base steel sheet, and performing final annealing to form glass coatings;

a coating-forming step of forming tension-applied insulation coatings on the glass coatings to obtain a grain-oriented electrical steel sheet including the base steel sheet, the glass coatings formed on the base steel sheet, and the tension-applied insulation coatings formed on the glass coatings; and a magnetic domain segmentation step of irradiating surfaces of the tension-applied insulation coatings of the grain-oriented electrical steel sheet with an energy ray to form a plurality of linear strain regions on the base steel sheet, wherein, in the magnetic domain segmentation step, among the plurality of linear strain regions, intervals of linear strain regions adjacent to each other in a rolling direction are 10 mm or less, an energy ray power density Ip in a unit of W/mm² that is defined by (P/S) using an energy ray output P in a unit of W and an energy ray irradiation cross-sectional area S in a unit of mm² satisfies the following expression (5), an energy ray input energy Up in a unit of J/mm that is defined by P/Vs using the energy ray output P and an energy ray scanning velocity Vs in a unit of mm/sec satisfies the following expression (6), and a beam aspect ratio of the energy ray, which is defined by (dl/dc) using a diameter dl in a direction perpendicular to a beam scanning direction and a diameter dc in the beam scanning direction, in a unit of μm, and the dl each satisfy the following expression (7) and the following expression (8), $$250 \leq Ip \leq 2{,}000 \qquad \text{Expression (5)}$$

$$0.010 < Up \leq 0.050 \qquad \text{Expression (6)}$$

$$0.0010 < dl/dc < 1.0000 \qquad (7)$$

$$10 < dl < 200 \qquad (8).$$

4. The method for manufacturing the grain-oriented electrical steel sheet according to claim 3,
wherein the energy ray is a laser beam.

5. The method for manufacturing the grain-oriented electrical steel sheet according to claim 4,
wherein the laser beam is a fiber laser beam.

6. The method for manufacturing the grain-oriented electrical steel sheet according to claim 3,
wherein the steel piece contains, by mass %, C: 0.010% to 0.200%, Si: 3.00% to 4.00%, sol. Al: 0.010% to 0.040%, Mn: 0.01% to 0.50%, N: 0.020% or less, S: 0.005% to 0.040%, P: 0.030% or less, Cu: 0% to 0.50%, Cr: 0% to 0.50%, Sn: 0% to 0.50%, Se: 0% to 0.020%, Sb: 0% to 0.500%, and Mo: 0% to 0.10%, and a remainder is Fe and impurities.

7. The method for manufacturing the grain-oriented electrical steel sheet according to claim 3,
wherein the decarburization annealing step has a temperature raising process and a soaking process,
in the temperature raising process, a temperature rising rate from 550° C. to 750° C. is set to 700 to 2,000° C./sec, an oxygen potential is set to 0.0001 to 0.0100, and
the soaking process includes a first soaking process where an annealing temperature is set to 800° C. to 900° C. and an annealing time is set to 100 to 500 seconds in an atmosphere having an oxygen potential of 0.4 or more and 0.8 or less and a second soaking process where an annealing temperature is set to 850° C. or higher and 1,000° C. or lower and an annealing time is set to 5 seconds or longer and 100 seconds or shorter in an atmosphere having an oxygen potential of 0.1 or less.

8. The method for manufacturing the grain-oriented electrical steel sheet according to claim 3, the method further comprising, during the decarburization annealing step or after the decarburization annealing step:
a nitriding treatment step of performing a nitriding treatment on the cold-rolled steel sheet.

9. A method for manufacturing the grain-oriented electrical steel sheet according to claim 2, the method comprising:
a hot rolling step of heating a steel piece to obtain a hot-rolled steel sheet by hot rolling;
a hot-rolled sheet annealing step of performing hot-rolled sheet annealing on the hot-rolled steel sheet;
a pickling step of pickling the hot-rolled steel sheet after the hot-rolled sheet annealing step;
a cold rolling step of performing cold rolling once or a plurality of times with annealing therebetween on the hot-rolled steel sheet after the pickling step to obtain a cold-rolled steel sheet;
a decarburization annealing step of performing decarburization annealing on the cold-rolled steel sheet;
a final annealing step of applying and drying an annealing separating agent containing a MgO powder as a main component onto front and rear surfaces of the cold-rolled steel sheet after the decarburization annealing step, which is the base steel sheet, and performing final annealing to form glass coatings;
a coating-forming step of forming tension-applied insulation coatings on the glass coatings to obtain a grain-oriented electrical steel sheet including the base steel sheet, the glass coatings formed on the base steel sheet, and the tension-applied insulation coatings formed on the glass coatings; and
a magnetic domain segmentation step of irradiating surfaces of the tension-applied insulation coatings of the grain-oriented electrical steel sheet with an energy ray to form a plurality of linear strain regions on the base steel sheet, wherein, in the magnetic domain segmentation step, among the plurality of linear strain regions, intervals of linear strain regions adjacent to each other in a rolling direction are 10 mm or less, an energy ray power density Ip in a unit of W/mm² that is defined by (P/S) using an energy ray output P in a unit of W and an energy ray irradiation cross-sectional area S in a unit of mm² satisfies the following expression (5), an energy ray input energy Up in a unit of J/mm that is defined by P/Vs using the energy ray output P and an energy ray scanning velocity Vs in a unit of mm/sec satisfies the following expression (6), and a beam aspect ratio of the energy ray, which is defined by (dl/dc) using a diameter dl in a direction perpendicular to a beam scanning direction and a diameter dc in the beam scanning direction, in a unit of μm, and the dl each satisfy the following expression (7) and the following expression (8), $$250 \leq Ip \leq 2{,}000 \qquad \text{Expression (5)}$$

$$0.010 < Up \leq 0.050 \qquad \text{Expression (6)}$$

$$0.0010 < dl/dc < 1.0000 \qquad (7)$$

$$10 < dl < 200 \qquad (8).$$

10. The method for manufacturing the grain-oriented electrical steel sheet according to claim 4,
wherein the steel piece contains, by mass %, C: 0.010% to 0.200%, Si: 3.00% to 4.00%, sol. Al: 0.010% to 0.040%, Mn: 0.01% to 0.50%, N: 0.020% or less, S: 0.005% to 0.040%, P: 0.030% or less, Cu: 0% to 0.50%, Cr: 0% to 0.50%, Sn: 0% to 0.50%, Se: 0% to 0.020%, Sb: 0% to 0.500%, and Mo: 0% to 0.10%, and a remainder is Fe and impurities.

11. The method for manufacturing the grain-oriented electrical steel sheet according to claim 5,
wherein the steel piece contains, by mass %, C: 0.010% to 0.200%, Si: 3.00% to 4.00%, sol. Al: 0.010% to 0.040%, Mn: 0.01% to 0.50%, N: 0.020% or less, S: 0.005% to 0.040%, P: 0.030% or less, Cu: 0% to 0.50%, Cr: 0% to 0.50%, Sn: 0% to 0.50%, Se: 0% to 0.020%, Sb: 0% to 0.500%, and Mo: 0% to 0.10%, and a remainder is Fe and impurities.

12. The method for manufacturing the grain-oriented electrical steel sheet according to claim 4,
wherein the decarburization annealing step has a temperature raising process and a soaking process,
in the temperature raising process, a temperature rising rate from 550° C. to 750° C. is set to 700 to 2,000° C./sec, an oxygen potential is set to 0.0001 to 0.0100, and
the soaking process includes a first soaking process where an annealing temperature is set to 800° C. to 900° C. and an annealing time is set to 100 to 500 seconds in an atmosphere having an oxygen potential of 0.4 or more and 0.8 or less and a second soaking process where an annealing temperature is set to 850° C. or higher and 1,000° C. or lower and an annealing time is set to 5 seconds or longer and 100 seconds or shorter in an atmosphere having an oxygen potential of 0.1 or less.

13. The method for manufacturing the grain-oriented electrical steel sheet according to claim 5,
wherein the decarburization annealing step has a temperature raising process and a soaking process,
in the temperature raising process, a temperature rising rate from 550° C. to 750° C. is set to 700 to 2,000° C./sec, an oxygen potential is set to 0.0001 to 0.0100, and
the soaking process includes a first soaking process where an annealing temperature is set to 800° C. to 900° C. and an annealing time is set to 100 to 500 seconds in an atmosphere having an oxygen potential of 0.4 or more and 0.8 or less and a second soaking process where an annealing temperature is set to 850° C. or higher and 1,000° C. or lower and an annealing time is set to 5 seconds or longer and 100 seconds or shorter in an atmosphere having an oxygen potential of 0.1 or less.

14. The method for manufacturing the grain-oriented electrical steel sheet according to claim 6,
wherein the decarburization annealing step has a temperature raising process and a soaking process,
in the temperature raising process, a temperature rising rate from 550° C. to 750° C. is set to 700 to 2,000° C./sec, an oxygen potential is set to 0.0001 to 0.0100, and
the soaking process includes a first soaking process where an annealing temperature is set to 800° C. to 900° C. and an annealing time is set to 100 to 500 seconds in an atmosphere having an oxygen potential of 0.4 or more and 0.8 or less and a second soaking process where an annealing temperature is set to 850° C. or higher and 1,000° C. or lower and an annealing time is set to 5 seconds or longer and 100 seconds or shorter in an atmosphere having an oxygen potential of 0.1 or less.

15. The method for manufacturing the grain-oriented electrical steel sheet according to claim 4, the method further comprising, during the decarburization annealing step or after the decarburization annealing step:
a nitriding treatment step of performing a nitriding treatment on the cold-rolled steel sheet.

16. The method for manufacturing the grain-oriented electrical steel sheet according to claim 5, the method further comprising, during the decarburization annealing step or after the decarburization annealing step:
a nitriding treatment step of performing a nitriding treatment on the cold-rolled steel sheet.

17. The method for manufacturing the grain-oriented electrical steel sheet according to claim 6, the method further comprising, during the decarburization annealing step or after the decarburization annealing step:
a nitriding treatment step of performing a nitriding treatment on the cold-rolled steel sheet.

18. The method for manufacturing the grain-oriented electrical steel sheet according to claim 7, the method further comprising, during the decarburization annealing step or after the decarburization annealing step:
a nitriding treatment step of performing a nitriding treatment on the cold-rolled steel sheet.

* * * * *